US012609413B1

(12) United States Patent
Hussain et al.

(10) Patent No.: US 12,609,413 B1
(45) Date of Patent: Apr. 21, 2026

(54) AQUEOUS ZINC-ION BATTERY CELL

(71) Applicant: King Fahd University of Petroleum and Minerals, Dhahran (SA)

(72) Inventors: Arshad Hussain, Dhahran (SA); Md. Abdul Aziz, Dhahran (SA); Mostafa Mahmoud Mohamed, Dhahran (SA); Mohammad Rezaul Karim, Riyadh (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/364,151

(22) Filed: Oct. 21, 2025

Related U.S. Application Data

(60) Provisional application No. 63/875,700, filed on Sep. 4, 2025.

(51) Int. Cl.
| | |
|---|---|
| *H01M 50/42* | (2021.01) |
| *H01M 4/42* | (2006.01) |
| *H01M 10/38* | (2006.01) |
| *H01M 50/44* | (2021.01) |
| *H01M 4/02* | (2006.01) |

(52) U.S. Cl.
CPC ............. *H01M 50/42* (2021.01); *H01M 4/42* (2013.01); *H01M 10/38* (2013.01); *H01M 50/44* (2021.01); *H01M 2004/027* (2013.01)

(58) Field of Classification Search
CPC ........ H01M 50/42; H01M 4/42; H01M 10/38; H01M 50/44; H01M 2004/027
See application file for complete search history.

(56) References Cited

U.S. PATENT DOCUMENTS

| | | | |
|---|---|---|---|
| 7,754,387 B2 * | 7/2010 | Harada .................. | D21H 13/16 |
| | | | 429/129 |
| 2008/0118848 A1 * | 5/2008 | Lee ......................... | H01M 6/40 |
| | | | 429/122 |
| 2011/0076197 A1 * | 3/2011 | Kook ................... | D01D 5/0007 |
| | | | 156/73.2 |
| 2019/0379040 A1 * | 12/2019 | Gerasopoulos ... | H01M 10/0569 |
| 2024/0396170 A1 * | 11/2024 | Wang .................. | H01M 10/052 |
| 2025/0046793 A1 * | 2/2025 | Tsuzuki ............... | H01M 4/364 |

FOREIGN PATENT DOCUMENTS

| | | |
|---|---|---|
| CN | 112657476 | 4/2021 |
| CN | 112952167 A | 6/2021 |
| CN | 116288943 B | 8/2024 |

(Continued)

OTHER PUBLICATIONS

Banik et al. "Suppressing Dendritic Growth During Alkaline Zinc Electrodeposition Using Polyethyleimine Additive." Electrochimica Acta 179 (2015) 475-481 (Year: 2015).*

(Continued)

*Primary Examiner* — Michael L Dignan
(74) *Attorney, Agent, or Firm* — Oblon, McClelland, Maier & Neustadt, L.L.P.

(57) ABSTRACT

An aqueous zinc-ion battery cell which includes a membrane, an electrolyte solution, a zinc metal anode, and a cathode. The membrane includes electrospun polyethylenimine (PEI) and polyacrylonitrile (PAN) in the form of entangled nanofibers. The cathode contains one or more of zinc and magnesium oxide.

18 Claims, 24 Drawing Sheets

50

(56)　　　　　　References Cited

FOREIGN PATENT DOCUMENTS

| | | | |
|---|---|---|---|
| EP | 2484431 | B1 | 6/2017 |
| KR | 10-1981655 | B1 | 8/2019 |

OTHER PUBLICATIONS

Chen et al. "Self-assembled zinc polyethylenimine shield for long-lasting zinc anodes." Journal of Power Sources 627 (2025) 235799 (Year: 2025).*

Wang et al. "Highly conductive polymer electrolytes based on PAN-PEI nanofiber membranes with in situ gelated liquid electrolytes for lithium-ion batteries." Polymer 230 (2021) 124038 (Year: 2021).*

Lin et al. "Revealing the effect of polyethylenimine on zinc metal anodes in alkaline electrolyte solution for zinc-air batteries: mechanism studies of dendrite suppression and corrosion inhibition." J. Mater. Chem. A, 2020, 8, 20637 (Year: 2020).*

Xuyao Wang, et. al., "Highly conductive polymer electrolytes based on PAN-PEI nanofiber membranes with in situ gelated liquid electrolytes for lithium-ion batteries", Polymer, vol. 230, Sep. 16, 2021, 124038, 6 Pages.

Xinwei Zhao, et. al., "Nitrogen-doped carbon networks derived from the electrospun polyacrylonitrile@branched polyethylenimine nanofibers as flexible supercapacitor electrodes", Journal of Alloys and Compounds, vol. 808, Nov. 5, 2019, 151737, 5 pages.

* cited by examiner

AQUEOUS ZINC-ION BATTERY CELL

CROSS REFERENCE TO RELATED APPLICATIONS

The present application claims priority to U.S. Patent Application No. 63/875,700, which was filed Sep. 4, 2025, and which is incorporated herein by reference in its entirety for all purposes.

STATEMENT REGARDING PRIOR DISCLOSURE BY THE INVENTORS

Aspects of the present disclosure are described by Hussain et al., "Advanced PEI/PAN Membrane to Suppress Zinc Dendrite Growth in Zinc Metal Batteries" published in Volume 19, 2024, Chemistry An Asian Journal, which is incorporated herein by reference in its entirety.

STATEMENT OF ACKNOWLEDGEMENT

Support provided by the Interdisciplinary Research Center for Hydrogen Technologies and Carbon Management (IRC-HTCM), King Fahd University of Petroleum & Minerals, Saudi Arabia through project INHE-22311, and King Saud University through project RSPD2024R956 is gratefully acknowledged.

BACKGROUND

Technical Field

The present disclosure is directed towards the method of manufacturing an aqueous zinc-ion battery cell, more particularly battery cells include a membrane, an electrolyte solution, a zinc metal anode, and a cathode.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Aqueous zinc-ion batteries (AZIBs) have gained significant attention as a safer, more environmentally friendly, and cost-effective alternative to lithium-ion batteries (LIBs), with promising potential for large-scale energy storage systems. Despite these advantages, one of the major barriers to their commercialization is the uncontrolled growth of zinc dendrites on the anode surface, which can pierce the separator, cause internal short circuits, and degrade the overall battery performance and safety. The separator, as a important component in battery architecture, must not only facilitate efficient ionic transport but also physically isolate the electrodes and resist mechanical damage from dendrite intrusion. Widely used separators such as glass fiber filter paper are attractive due to their low cost and high electrolyte absorption capacity; however, their mechanical fragility and large, irregular pores make them highly susceptible to dendritic penetration, leading to poor cycle stability and safety risks. Although alternative dense membrane materials like Nafion and composite separators have demonstrated improved dendrite resistance, their high manufacturing costs and complex synthesis procedures hinder their practical scalability.

Polyacrylonitrile (PAN), a chemically stable and membrane-forming polymer, has been investigated for separator applications owing to its polar nitrile groups that enhance ionic conductivity. Nevertheless, PAN's high crystallinity and poor interfacial compatibility with metal anodes often lead to increased resistance and limited electrochemical performance. Modification strategies to address these shortcomings frequently result in reduced porosity, compromised mechanical integrity, and manufacturing challenges. On the other hand, polyethyleneimine (PEI), a polymer rich in amino groups, has shown potential in mitigating dendrite growth and scavenging acidic species, yet remains underutilized in scalable separator designs. Collectively, these limitations underscore the urgent need for the development of a cost-effective, structurally robust, and electrochemically stable separator capable of suppressing dendritic growth while ensuring long-term performance and scalability for practical AZIB applications.

Accordingly, one object of the present disclosure is to provide a method of forming an aqueous zinc-ion battery cell that may circumvent the above specified drawbacks and limitation of the materials and methods known in the art.

SUMMARY

In an exemplary embodiment, an aqueous zinc-ion battery cell is described. The zinc-ion battery cell includes a membrane, an electrolyte solution, a zinc metal anode, and a cathode. The membrane includes electrospun polyethylenimine (PEI) and polyacrylonitrile (PAN) in the form of entangled nanofibers. The cathode contains one or more selected from the group consisting of zinc and magnesium oxide.

In some embodiments, the zinc ion battery has a capacity of 170-190 A g$^{-1}$.

In some embodiments, the zinc ion battery has a discharge/capacity of 100-150 mAh g$^{-1}$ over 80-120 cycles.

In some embodiments, the membrane has a thickness of 150-250 $\mu$m.

In some embodiments, the membrane has a porosity of 70-95%.

In some embodiments, the membrane has an ionic conductivity of 3-7×10$^{-4}$ S cm$^{-1}$.

In some embodiments, the membrane has a bulk resistance of 1-3Ω.

In some embodiments, the membrane has an electrolyte uptake of 600-1000%.

In some embodiments, the membrane has less than 5% thermal shrinkage up to 200° C.

In some embodiments, the membrane is semicrystalline by XRD.

In another exemplary embodiment, a method of making the membrane is described. The method includes dissolving PEI in a first organic solvent at 60-100° C. to form a first solution. The method further includes dissolving PAN in a first organic solvent at 10-40° C. to form a second solution followed by mixing the first solution and the second solution together to form a mixture. The method further includes electrospinning the mixture to form nanofibers and then drying the nanofibers to form the membrane.

In some embodiments, the first solvent is dimethylformamide.

In some embodiments, the second solvent is dimethylformamide.

In some embodiments, the mixture is electrospun at a flow rate of 40-80 mL $h^{-1}$.

In some embodiments, the mixture is electrospun at a voltage of 15-25 kV.

In some embodiments, the mixture is electrospun at a distance of 100-200 mm between the tip of a needle and a collection surface.

In another exemplary embodiment, a method of making the cathode is described. The method includes combining metal oxide, carbon black, polyvinylidene fluoride, N-methylpyrrolidone, and an agate mortar to form a mixture. The method further includes applying the mixture to a carbon cloth substrate and heating for 8-16 hours at a temperature of 60-100° C. to form the cathode.

In some embodiments, the metal oxide is manganese oxide.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
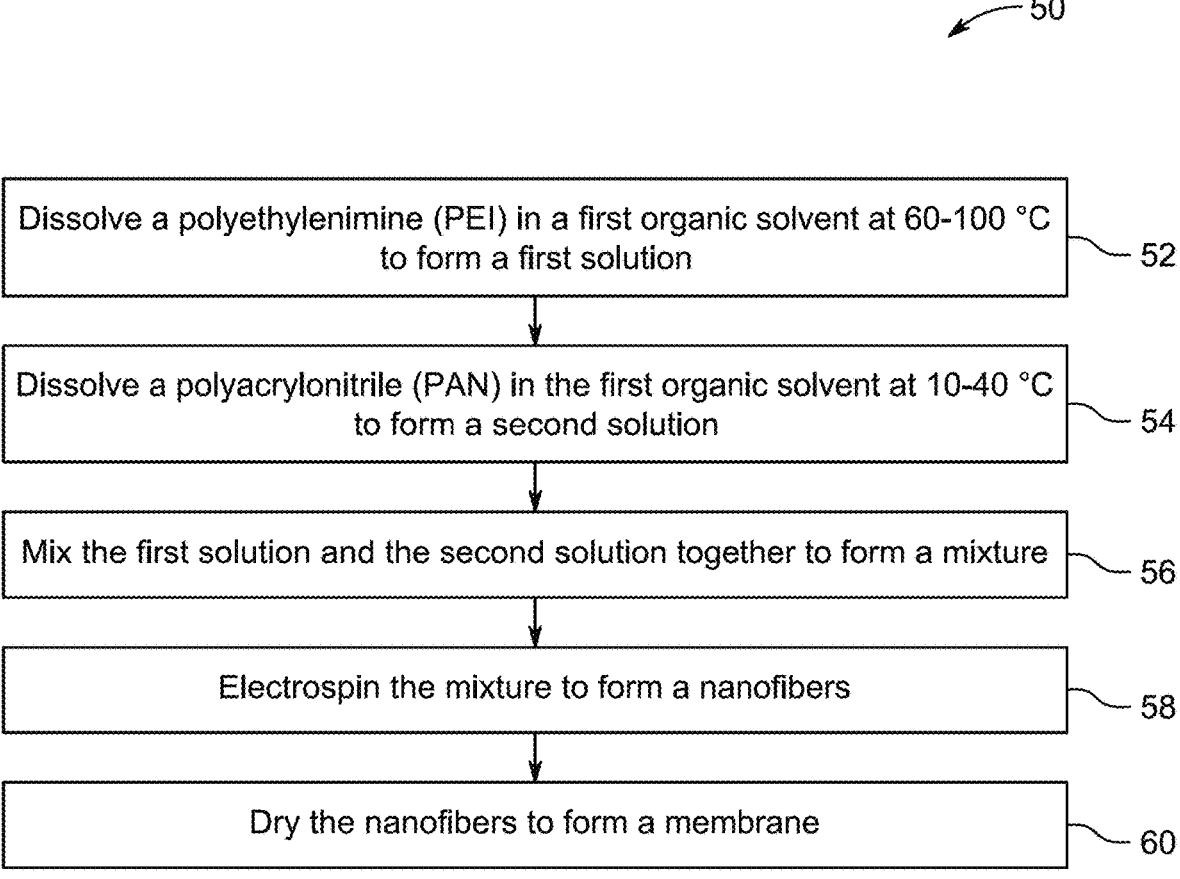
FIG. 1 is a schematic diagram of an exemplary flow chart of a method of making the membrane, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'zinc-ion battery cell' refers to a rechargeable electrochemical cell that utilizes zinc ions as charge carriers between the anode and cathode through an electrolyte.

As used herein, the term 'an electrolyte solution' refers to a liquid medium containing dissolved salts that enables the movement of ions between the electrodes during battery operation.

As used herein, the term 'anode' refers to a negative electrode in a battery where oxidation occurs and zinc metal is typically deposited or stripped during cycling.

As used herein, the term 'cathode' refers to a positive electrode in a battery where reduction reactions occur, typically involving the insertion or extraction of zinc ions.

As used herein, the term 'discharge/capacity' refers to a measure of the total amount of electric charge a battery can deliver during discharge, typically expressed in mAh or mAh g$^{-1}$.

As used herein, the term 'capacity' refers to a battery's ability to store and deliver electrical energy, measured as the amount of charge stored per unit mass or volume of electrode material.

As used herein, the term 'ionic conductivity' refers to a measure of how easily ions can move through a material, typically the electrolyte or separator, and is expressed in S cm$^{-1}$.

As used herein, the term 'porosity' refers to the fraction of the volume of void spaces within a material, such as a membrane, that can be filled with electrolyte.

As used herein, the term 'bulk resistance' refers to the resistance provided by the electrolyte or separator to ion flow within the battery, affecting overall conductivity.

As used herein, the term 'electrolyte uptake' refers to the ability of a membrane or separator to absorb and retain a liquid electrolyte, often expressed as a percentage of weight gain.

As used herein, the term 'thermal shrinkage' refers to the dimensional contraction of a material, such as a membrane, when exposed to elevated temperatures, indicating its thermal stability.

As used herein, the term 'electrospinning' refers to a fiber production technique that uses an electric field to draw charged threads of polymer solutions or melts into ultrafine fibers.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

An aspect of the present disclosure is directed towards the method of fabricating a PEI/PAN-based electrospun nanofiber membrane with enhanced porosity and electrolyte wettability for improving zinc dendrite resistance in aqueous zinc-ion batteries.

An aqueous zinc-ion battery cell is described. The aqueous zinc-ion battery cell includes a membrane, an electrolyte solution, a zinc metal anode, and a cathode.

In some embodiments, the membrane may include, but is not limited to, materials such as polyvinylidene fluoride (PVDF), polysulfone (PSf), polyethersulfone (PES), cellulose acetate (CA), polytetrafluoroethylene (PTFE), polyvinyl alcohol (PVA), polyamide (PA), polyimide (PI), polyethylene (PE), polypropylene (PP), polymethyl methacrylate (PMMA), polycarbonate (PC), chitosan, poly(lactic acid) (PLA), poly(ethylene glycol) (PEG), poly(ethylene oxide) (PEO), sulfonated polyether ether ketone (SPEEK), Nafion, and thermoplastic polyurethane (TPU). In a preferred embodiment, the membrane includes electrospun polyethylenimine (PEI) and polyacrylonitrile (PAN).

In some embodiments, the membrane consists essentially of sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, the membrane is in the form of entangled nanofibers.

In some embodiments, the cathode may include, but is not limited to, materials such as manganese dioxide ($MnO_2$), vanadium pentoxide ($V_2O_5$), copper oxide (CuO), nickel cobaltite ($NiCo_2O_4$), iron oxide ($Fe_2O_3$), cobalt oxide ($Co_3O_4$), titanium dioxide ($TiO_2$), sodium vanadate ($NaV_3O_8$), silver vanadate ($AgVO_3$), lithium cobalt oxide ($LiCoO_2$), lithium iron phosphate ($LiFePO_4$), potassium manganese oxide ($KxMnO_2$), bismuth oxide ($Bi_2O_3$), tin oxide ($SnO_2$), nickel hydroxide ($Ni(OH)_2$), molybdenum disulfide ($MoS_2$), tungsten trioxide ($WO_3$), vanadium oxide ($VO_2$), nickel phosphate ($Ni_3(PO_4)_2$), copper sulfide (CuS), iron phosphate ($FePO_4$), sodium manganese oxide ($NaMnO_2$), cobalt phosphate ($Co_3(PO_4)_2$), nickel oxide (NiO), cobalt hydroxide ($Co(OH)_2$), vanadium nitride (VN), titanium carbide ($Ti_3C_2$), cerium oxide ($CeO_2$), manganese ferrite ($MnFe_2O_4$), and barium titanate ($BaTiO_3$). In a preferred embodiment, the cathode contains one or more selected from the group consisting of zinc and magnesium oxide.

In some embodiments, the electrolyte solution may include, but is not limited to, materials such as lithium bis(trifluoromethanesulfonyl)imide (LiTFSI), potassium chloride (KCl), sodium sulfate ($Na_2SO_4$), lithium perchlorate ($LiClO_4$), ammonium sulfate (($NH_4)_2SO_4$), aluminum nitrate ($Al(NO_3)_3$), calcium chloride ($CaCl_2$), magnesium nitrate ($Mg(NO_3)_2$), sodium chloride (NaCl), lithium nitrate ($LiNO_3$), potassium nitrate ($KNO_3$), copper sulfate ($CuSO_4$), nickel sulfate ($NiSO_4$), cobalt sulfate ($CoSO_4$), sodium acetate ($CH_3COONa$), lithium acetate ($CH_3COOLi$), boric acid ($H_3BO_3$), lithium iodide (LiI), sodium phosphate ($Na_3PO_4$), cesium chloride (CsCl), tetra-ethylammonium tetrafluoroborate ($TEABF_4$), lithium hexafluorophosphate ($LiPF_6$), potassium hydroxide (KOH), sodium hydroxide (NaOH), lithium hydroxide (LiOH), ethylene carbonate (EC), propylene carbonate (PC), dimethyl carbonate (DMC), acetonitrile (ACN), and formamide. In a preferred embodiment, the electrolyte solution is zinc sulphate and manganese sulphate.

In some embodiments, the zinc ion battery has a capacity ranging from 170-190 A $g^{-1}$, preferably 172-190 A $g^{-1}$, preferably 174-190 A $g^{-1}$, preferably 176-190 A $g^{-1}$, preferably 178-190 A $g^{-1}$, preferably 180-190 A $g^{-1}$, preferably 182-190 A $g^{-1}$, preferably 184-190 A $g^{-1}$ preferably 186-190 A $g^{-1}$, preferably 188-190 A $g^{-1}$. In a preferred embodiment, the zinc ion battery has a capacity of 181 A $g^{-1}$.

In some embodiments, the zinc ion battery has a discharge/capacity ranging from 100-150 mAh $g^{-1}$, preferably 105-150 mAh $g^{-1}$, preferably 110-150 mAh $g^{-1}$, preferably 115-150 mAh $g^{-1}$, preferably 120-150 mAh $g^{-1}$, preferably 125-150 mAh $g^{-1}$, preferably 130-150 mAh $g^{-1}$, preferably 135-150 mAh $g^{-1}$, preferably 140-150 mAh $g^{-1}$, preferably 145-150 mAh $g^{-1}$ over 80-120 cycles, preferably 85-120 cycles, preferably 90-120 cycles, preferably 95-120 cycles, preferably 100-120 cycles, preferably 105-120 cycles, preferably 110-120 cycles, preferably 115-120 cycles. In a preferred embodiment, the zinc ion battery has a discharge/capacity of 123 mAh $g^{-1}$ over 100 cycles.

In some embodiments, the PEI/PAN membrane has a thickness ranging from 150-250 μm, preferably 160-250 μm, preferably 170-250 μm, preferably 180-250 μm, preferably 190-250 μm, preferably 200-250 μm, preferably 210-250 μm, preferably 220-250 μm, preferably 230-250 μm, preferably 240-250 μm. In a preferred embodiment, the PEI/PAN membrane has a thickness of 200 μm.

In some embodiments, the PEI/PAN membrane has a porosity ranging from 70-95%, preferably 72-95%, preferably 74-95%, preferably 76-95%, preferably 78-95%, preferably 80-95%, preferably 82-95%, preferably 84-95%, preferably 86-95%, preferably 88-95%, preferably 90-95%, preferably 92-95%, preferably 94-95%. In a preferred embodiment, the PEI/PAN membrane has a porosity of 82%.

In some embodiments, the PEI/PAN membrane has an ionic conductivity ranging from $3-7\times10^{-4}$ S $cm^{-1}$, preferably $3.5-7\times10^{-4}$ S $cm^{-1}$, preferably $4-7\times10^{-4}$ S $cm^{-1}$, preferably $4.5-7\times10^{-4}$ S $cm^{-1}$, preferably $5-7\times10^{-4}$ S $cm^{-1}$, preferably $5.5-7\times10^{-4}$ S $cm^{-1}$, preferably $6-7\times10^{-4}$ S $cm^{-1}$, preferably $6.5-7\times10^{-4}$ S $cm^{-1}$. In a preferred embodiment, the PEI/PAN membrane has an ionic conductivity $5.3\times10^{-4}$ S $cm^{-1}$.

In some embodiments, the PEI/PAN membrane has a bulk resistance ranging from 1-3Ω, preferably 1.2-3Ω, preferably 1.4-3Ω, preferably 1.6-3Ω, preferably 1.8-3Ω, preferably 2-3Ω, preferably 2.2-3Ω, preferably 2.4-3Ω, preferably 2.6-3Ω, preferably 2.8-3Ω. In a preferred embodiment, the PEI/PAN membrane has a bulk resistance of 2Ω.

In some embodiments, the PEI/PAN membrane has an electrolyte uptake ranging from 600-1000%, preferably 650-1000%, preferably 700-1000%, preferably 750-1000%, preferably 800-1000%, preferably 850-1000%, preferably 900-1000%, preferably 950-1000%. In a preferred embodiment, the PEI/PAN membrane has an electrolyte uptake of 800%.

In some embodiments, the PEI/PAN membrane has less than 5%, preferably less than 4%, preferably less than 3%, preferably less than 2%, preferably less than 1% thermal shrinkage up to 200° C. In some embodiments, the PEI/PAN membrane may include crystalline phases, but is not limited to Quartz, Calcite, Hematite, Magnetite, Goethite, Dolomite, Albite, Anorthite, Pyrite, Fluorite, Halite, Barite, Apatite, Rutile, and Zircon. In a preferred embodiment, the PEI/PAN membrane is semicrystalline by XRD.

FIG. 1 illustrates a schematic flow chart of a method 50 of forming the membrane. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes dissolving PEI in a first organic solvent at 60-100° C. to form a first solution. In some embodiments, the first organic solvent may include, but is not limited to, solvents such as dimethyl sulfoxide (DMSO), tetrahydrofuran (THF), acetone, ethanol, methanol, isopropanol, acetonitrile, ethyl acetate, butanol, propylene carbonate, ethylene carbonate, toluene, chloroform, diethyl ether, 1,4-dioxane, N-methyl-2-pyrrolidone (NMP), benzene, dichloromethane (DCM), hexane, heptane, cyclohexane, formamide, trichloroethylene, methyl ethyl ketone (MEK), isobutanol, tert-butanol, pyridine, carbon tetrachloride, nitromethane, and phenol. In a preferred embodiment, the first solvent is dimethylformamide (DMF).

In some embodiments, PEI is dissolved in DMF solvent for 10-60 minutes, preferably 15-60 minutes, preferably 20-60 minutes, preferably 25-60 minutes, preferably 30-60 minutes, preferably 35-60 minutes, preferably 40-60 minutes, preferably 45-60 minutes, preferably 50-60 minutes, preferably 55-60 minutes at 60-100° C., preferably 65-100° C., preferably 70-100° C., preferably 75-100° C., preferably 80-100° C., preferably 85-100° C., preferably 90-100° C., preferably 95-100° C. In a preferred embodiment, PEI is dissolved in DMF solvent for 60 minutes at 80° C.

At step 54, the method 50 includes dissolving PAN in the first organic solvent at 10-40° C. to form a second solution. In some embodiments, the second organic solvent may include, but is not limited to, solvents such as dimethyl sulfoxide (DMSO), tetrahydrofuran (THF), acetone, ethanol, methanol, isopropanol, acetonitrile, ethyl acetate, butanol, propylene carbonate, ethylene carbonate, toluene, chloroform, diethyl ether, 1,4-dioxane, N-methyl-2-pyrrolidone (NMP), benzene, dichloromethane (DCM), hexane, heptane, cyclohexane, formamide, trichloroethylene, methyl ethyl ketone (MEK), isobutanol, tert-butanol, pyridine, carbon tetrachloride, nitromethane, and phenol. In a preferred embodiment, the second solvent is dimethylformamide (DMF).

In some embodiments, PAN is dissolved in DMF solvent for 10-60 minutes, preferably 15-60 minutes, preferably 20-60 minutes, preferably 25-60 minutes, preferably 30-60 minutes, preferably 35-60 minutes, preferably 40-60 minutes, preferably 45-60 minutes, preferably 50-60 minutes, preferably 55-60 minutes at 10-40° C., preferably 15-40° C., preferably 20-40° C., preferably 25-40° C., preferably 30-40° C., preferably 35-40° C. In a preferred embodiment, PAN is dissolved in DMF solvent for 30 minutes at 25° C.

At step 56, the method 50 includes mixing the first solution and the second solution together to form a mixture. In some embodiments, the mixing is done by, but is not limited to, methods such as ultrasonication, magnetic stirring, vortex mixing, ball milling, high-shear mixing, planetary mixing, homogenization, overhead stirring, blade stirring, impeller stirring, rotor-stator mixing, centrifugal mixing, static mixing, propeller stirring, paddle mixing, tumbler mixing, jet mixing, acoustic mixing, emulsification, and orbital shaking. In a preferred embodiment, the first solution and the second solution is mixed together by mechanical stirrer.

In some embodiments, the first solution and the second solution are mixed together for 10-60 minutes, preferably 15-60 minutes, preferably 20-60 minutes, preferably 25-60 minutes, preferably 30-60 minutes, preferably 35-60 minutes, preferably 40-60 minutes, preferably 45-60 minutes, preferably 50-60 minutes, preferably 55-60 minutes. In a preferred embodiment, the first solution and the second solution are mixed together for 60 minutes.

At step 58, the method 50 includes electrospinning the mixture to form nanofibers. In some embodiments, the mixture is electrospun at a flow rate ranging from 40-80 mL h$^{-1}$, preferably 45-80 mL h$^{-1}$, preferably 50-80 mL h$^{-1}$, preferably 55-80 mL h$^{-1}$, preferably 60-80 mL h$^{-1}$, preferably 65-80 mL h$^{-1}$, preferably 70-80 mL h$^{-1}$, preferably 75-80 mL h$^{-1}$. In a preferred embodiment, the mixture is electrospun at a flow rate of 60 mL h$^{-1}$.

In some embodiments, the mixture is electrospun at a voltage ranging from 15-25 kV, preferably 16-25 kV, preferably 17-25 kV, preferably 18-25 kV, preferably 19-25 kV, preferably 20-25 kV, preferably 21-25 kV, preferably 22-25 kV, preferably 23-25 kV, preferably 24-25 kV. In a preferred embodiment, the mixture is electrospun at a voltage of 19 kV.

In some embodiments, the mixture is electrospun at a distance ranging from 100-200 mm, preferably 110-200 mm, preferably 120-200 mm, preferably 130-200 mm, preferably 140-200 mm, preferably 150-200 mm, preferably 160-200 mm, preferably 170-200 mm, preferably 180-200 mm, preferably 190-200 mm between the tip of a needle and a collection surface. In a preferred embodiment, the mixture is electrospun at a distance of 150 mm.

At step 60, the method 50 includes drying the nanofibers to form the membrane. In some embodiments, drying is done by, but is not limited to, methods such as vacuum drying, freeze drying, spray drying, air drying, infrared drying, microwave drying, solar drying, lyophilization, desiccator drying, convective drying, fluidized bed drying, tunnel drying, drum drying, rotary drying, shelf drying, nitrogen purging, hot plate drying, supercritical drying, flash drying, and sublimation drying. In a preferred embodiment, the nanofibers is dried in electric oven to form membrane.

A method of making the cathode is described. The method includes combining a metal oxide, carbon black, polyvinylidene fluoride, N-methylpyrrolidone, and an agate mortar to form a mixture. In some embodiments, the metal oxide may include, but is not limited to, titanium dioxide ($TiO_2$), zinc oxide (ZnO), iron oxide ($Fe_2O_3$), copper oxide (CuO), nickel oxide (NiO), cobalt oxide ($Co_3O_4$), aluminum oxide ($Al_2O_3$), tin oxide ($SnO_2$), vanadium pentoxide ($V_2O_5$), chromium oxide ($Cr_2O_3$), cerium oxide ($CeO_2$), molybdenum trioxide ($MoO_3$), tungsten trioxide ($WO_3$), bismuth oxide ($Bi_2O_3$), zirconium dioxide ($ZrO_2$), magnesium oxide (MgO), indium oxide ($In_2O_3$), gallium oxide ($Ga_2O_3$), lead oxide (PbO), and antimony oxide ($Sb_2O_3$). In a preferred embodiment, the metal oxide is manganese oxide.

The method of making cathode may include applying the mixture to a carbon cloth substrate and heating for 8-16 hours, preferably 9-16 hours, preferably 10-16 hours, preferably 11-16 hours, preferably 12-16 hours, preferably 13-16 hours, preferably 14-16 hours, preferably 15-16 hours at a temperature of 60-100° C., preferably 65-100° C., preferably 70-100° C., preferably 75-100° C., preferably 80-100° C., preferably 85-100° C., preferably 90-100° C., preferably 95-100° C. to form the cathode. In a preferred embodiment, carbon cloth substrate is heated at 12 hours at a temperature of 80° C.

The following examples are provided solely for illustration and are not to be construed as limitations of the present disclosure, as many variations thereof are possible without departing from the spirit and scope of the present disclosure.

EXAMPLES

The following examples demonstrate a method of forming an aqueous zinc-ion battery cell. The examples are provided solely for illustration and are not to be construed as limitations of the present disclosure, as many variations thereof are possible without departing from the spirit and scope of the present disclosure.

Example 1: Materials and Methods

PEI (Ultem™ resin 1000, SABIC), PAN (MW=150,000), zinc chloride ($ZnCl_2$), N, N-Dimethylformamide (DMF) and Hydrochloric acid (HCl) were also acquired from Sigma Aldrich. Whatman filter papers, carbon black from MTI CORP, zinc sulfate ($ZnSO_4 \cdot 7H_2O$, Loba Chemie), graphite foil, polyvinylidene fluoride (PVDF), and 1-methyl-2-pyrrolidone (NMP) were also purchased from Sigma-Aldrich.

Electrospinning Membrane Fabrication

The PEI/PAN membranes were prepared by electrospinning method. Compared with other methods, this is relatively simple and versatile and is much easier to upscale. And morphology can be easily controlled. While the dry, and wet processes are a bit time consuming, and its capacity for upscale is relatively limited. Secondly, the equipment used in the dry and wet processes is complicated, which leads to a relatively high cost. A suitable amount of PEI polymer was dissolved in DMF solvent for 60 minutes at 80° C. with a magnetic stirrer to yield a 2% (wt %) solution. Following a period of 60 minutes of agitation, the temperature of the magnetic stirrer was switched off. The mixture was then allowed to come to room temperature, and a 10 wt. % PAN solution was made by mixing PAN and DMF for 30 minutes at ambient temperature using a magnetic stirrer. A mechanical stirrer was used to mix the PEI and PAN solutions thoroughly for 60 minutes at a ratio of 1:3. Sonication was used for 30 minutes to eliminate the bubbles following mixing.

A plastic syringe was used to hold the pre-made PEI-PAN solutions before the process of electrospinning PEI-PAN polymers went into motion. that was 10 milliliters in capacity with a needle made of stainless-steel measuring 0.6 millimeters in diameter. The syringe's needle was connected to a high-voltage source via a syringe pump, which generated voltages as high as 30 kV. The electrospinning of PEI-PAN polymers was carried out under specific and documented conditions, which included a relative humidity of twenty percent, a flow rate of sixty milliliters per hour, a voltage of nineteen kilovolts, and a distance of one hundred fifty millimeters the space between the tip of the needle and the collection. Finally, electrospinning the nanofiber membranes dried them out, and then they were dried in an electric oven for further characterization.

Characterization

A field-emission scanning electron microscope, or FE-SEM, was used to examine the shape of the prepared membranes (JSM7600, JEOL). During the course of the experiment, carbon tape was initially used to secure the samples to a sample stab holder to increase their electrical conductivity and prevent the fibers from becoming electrostatically charged. After coating, nanofiber membranes were examined in a FE-SEM operating at a high vacuum. A thermogravimetric analyzer was utilized in order to evaluate the thermal stability of membranes in a nitrogen environment and at temperatures ranging from fifty to one thousand degrees Celsius. The phase structure of the polymer membranes was examined using X-ray diffraction (XRD), utilizing $Cu—K_\alpha$ radiation (wavelength=0.15416 nm).

Manganese Oxide Cathode Preparation

A uniform slurry was made of manganese oxide, carbon black, and PVDF in NMP solvent in a mass ratio of 7.5:1.5:1. This mixture was then mixed with an agate mortar to produce the manganese oxide cathode ($MnO_2$). After that, this mixture was applied to a carbon cloth substrate with a diameter of 16 mm, and it was heated to 80° C. for 12 hours in an electric oven. As a result, each electrode has an effective area of 2 cm² and a mass loading of approximately 1 mg cm⁻².

Electrochemical Measurements

Zn metal was used as the negative electrode and $MnO_2$ as the positive electrode in the fabrication of the AZIBs cell. A 19 μm diameter membrane/separator was placed between the electrodes and immersed in an electrolyte containing 2 M $ZnSO_4$. The symmetric cell's cathode and anode were Zn metal foils without treatment. Next, 100 μL of electrolytes were used for both Zn/Zn and Zn/$MnO_2$ cells. Electrochemical performance was measured at room temperature using CP2032 coin-type cells. Cyclic voltammetry (CV) was carried out by means of electrochemical workstation measurements (CH-Instrument-760E). This was accomplished by wide the voltage assortment between 0.2 and 1.8 V at scan speeds ranging from 10 to 200 mV s⁻¹. A potential amplitude of 10 millivolts was used to conduct electrochemical impedance spectroscopy (EIS) measurements ranging from 0.01 kilohertz to 100 kilohertz. The electrochemical stability of membrane at ambient temperature was evaluated using linear sweep voltammetry (LSV) in the voltage range from 1 to 2.5 V at 5 mVs⁻¹. The batteries performance was performed using a Land battery test system (LAND CT-3002A) with a 0.2 to 1.8 V operational voltage window at 25° C.

Calculations

EIS was employed to evaluate the ionic conductivity of the electrolyte-soaked membrane samples by the stainless-steel (SS) coin cells (SS/PEI-PAN/SS, SS/filter paper/SS). The Nyquist plot was calculated to simulate bulk resistance Rb (Equation 1) on 10 mV AC sinusoidal amplitude with a 0.1 to 1×10⁶ Hz frequency range.

$$\text{Ionic conductivity} \cdot \left(S \cdot cm^{-1}\right) \cdot = \frac{L}{R_b \times S} \tag{1}$$

S and L can be ascribed to the effective area and thickness of the pristine and modified samples, respectively. The thickness of the membrane is measured with a micrometer (Mitutoyo), which is able to give the most accurate results. Micrometers are capable of delivering measurements to the nearest micron, which provides a highly precise look at the thickness of even a single membrane. In order to conduct out the electrolyte uptake analysis in accordance with equation 2, a liquid electrolyte was used to immerse the membrane. for a period of twenty-four hours. During this time, a difference in weight was detected both before ($W_o$) and after ($W_t$) the experiment and recorded.

$$\text{Electrolyte uptake } (\%) = \frac{W_t - W_0}{W_o} \tag{2}$$

The thermal dimensional stability of the membranes was evaluated using the sample's dimensional shift, which was obtained by simply heating each membrane independently for an hour at a temperature ranging from 25 to 200° C. The thermal shrinkage was then calculated by utilizing equation (3) to calculate the dimensional change prior to and post heat treatment.

$$\text{Thermal shrinkage} \cdot (\%) = \frac{D_a - D_b}{D_a} \times 100\% \tag{3}$$

in which $D_a$ is the pre-heat treatment area of the membranes and $D_b$ is the post-heat treatment area of the same membranes.

To evaluate the porosity of the fabricated membranes, samples were immersed in n-butanol for 24 h. Further, recording the weight differential between the samples earlier ($W_b$) and later ($W_d$) the investigation, with the polymer and butanol densities indicated by; $\rho_b$ and, $\rho_d$.

$$\text{Porosity} \cdot (\%) = \frac{W_b/\rho_b}{\frac{W_b}{\rho_b} + \frac{W_{d'}}{\rho_d}} \cdot \tag{4}$$

Figure 2A:
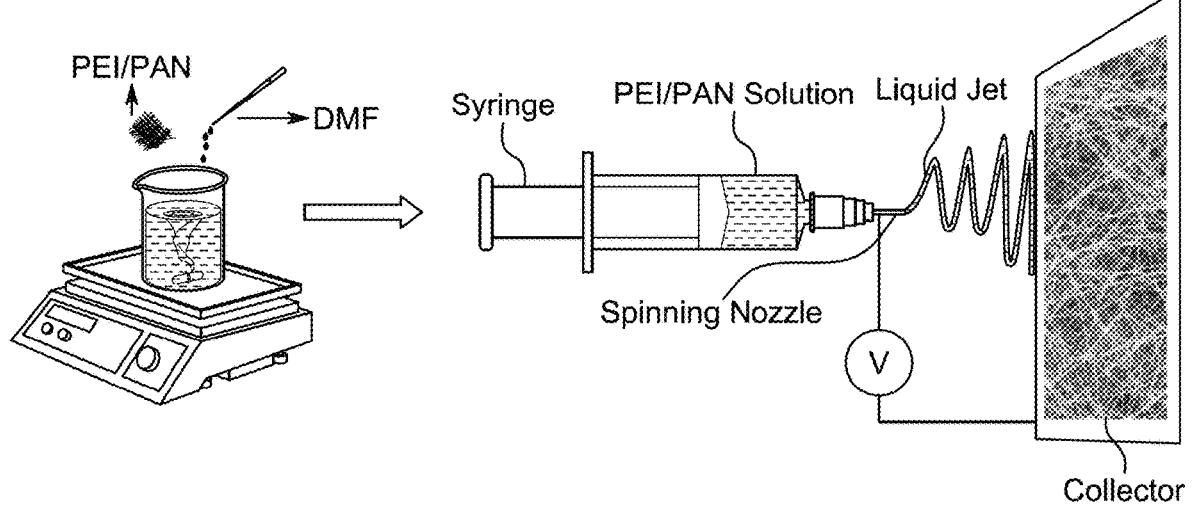
FIG. 2A is a schematic diagram of the fabrication method of the PEI/PAN membrane, according to certain embodiments.
Figure 2B:
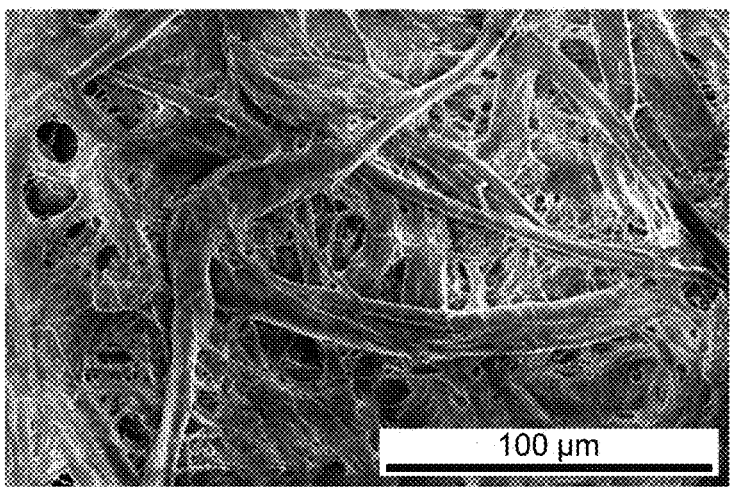
FIG. 2B is an imagery of the filter paper taken from the top surfaces of the scanning electron microscope (SEM) at 100 μm magnification, according to certain embodiments.
Figure 2C:
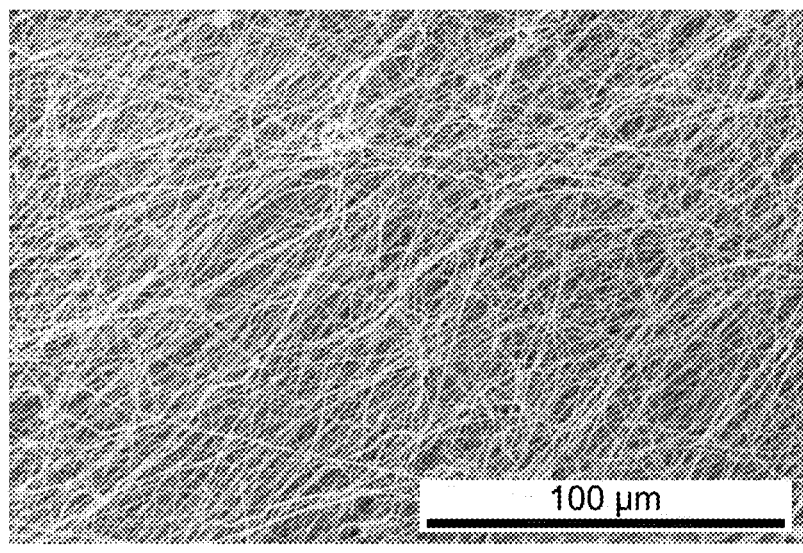
FIG. 2C is an imagery of the prepared PEI/PAN taken from the top surfaces of the SEM at 100 μm magnification, according to certain embodiments.
Figure 2D:
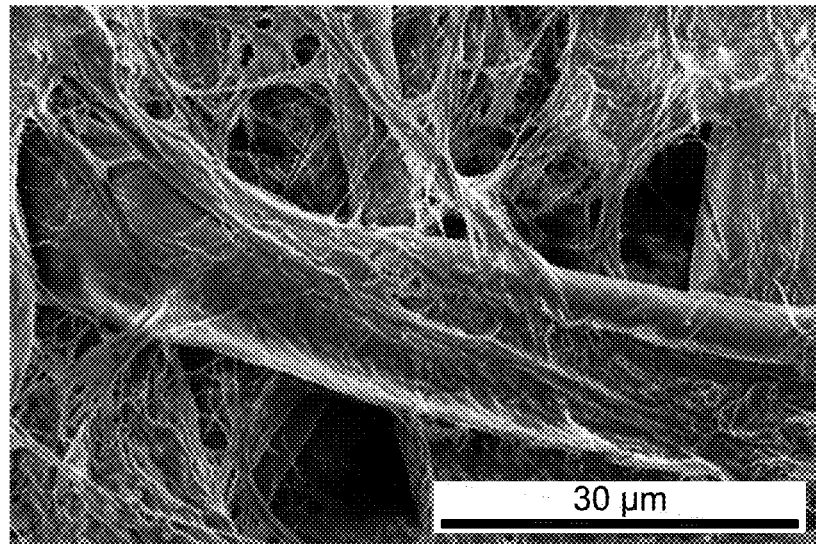
FIG. 2D is an imagery of the filter paper taken from the top surfaces of the SEM at 30 μm magnification, according to certain embodiments.
Figure 2E:
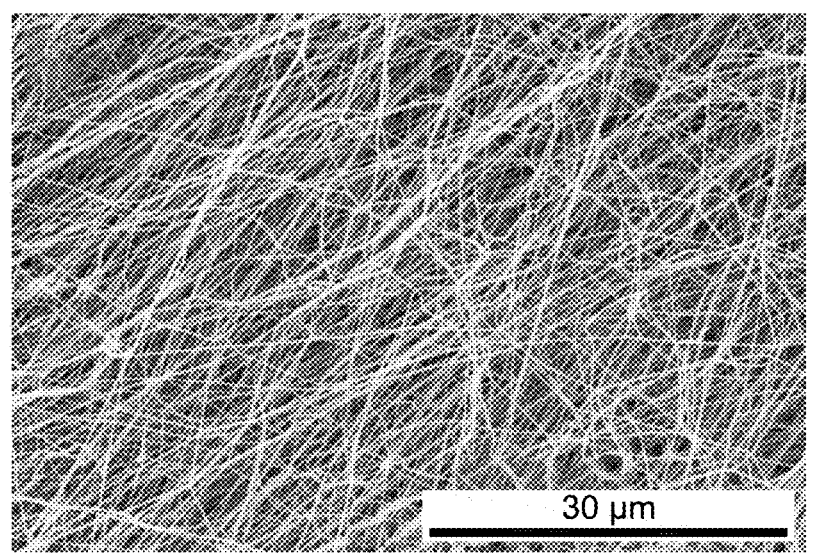
FIG. 2E is an imagery of the prepared PEI/PAN taken from the top surfaces of the SEM at 30 μm magnification, according to certain embodiments.
Figure 3:
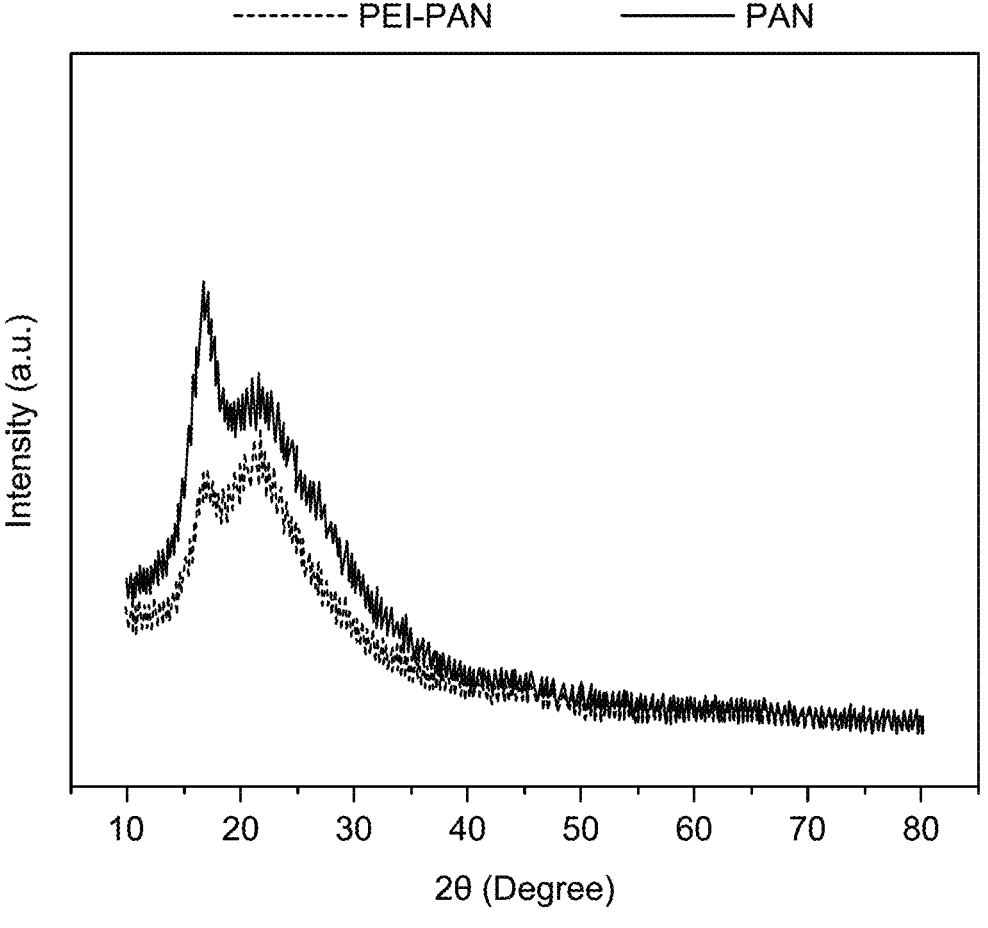
FIG. 3 is an X-Ray diffraction (XRD) pattern of nanofiber PAN and PEI/PAN membranes, according to certain embodiments.

Electrospinning makes polymer nanofibers by overcoming Taylor cone droplet surface tension. Electrospun nanofiber separators feature rich surface functional groups, high porosity, ultra-stretchability, and high strength/toughness. The sluggish manufacture of electrospun separators limits their usage in AZIBs to lab-scale research. Thus, we created an electrospinning technology for high-throughput nanofiber-based membrane fabrication. The PEI/PAN membrane preparation procedure is shown in FIG. 2A. The morphology of the PEI/PAN nanofiber membrane that was fabricated is uniform, flexible, and freestanding. SEM pictures of the various separators are displayed in FIGS. 2B-E. The filter paper displays a non-uniform structure with unkempt winding fibers that generate many big pores FIG. 2B and FIG. 2D. The vast and irregular porous structure will cause an "isolated island" to form on the electrode/separator contact and inhomogeneous 2D diffusion of $Zn^{2+}$. Even worse, big, irregular pores in loose materials can result in a fatal mechanical strength fault after electrolyte absorption. The PEI-PAN membranes exhibit more consistent pore size distributions FIG. 2C and FIG. 2E. High electrolyte absorption can be ensured, and dendrite penetration can be inhibited by the channels made by stacking that are continuous and curved. A comparison of the XRD patterns of the PEI/PAN membrane and the PAN membrane is presented in FIG. 3. It was determined that the semi-crystalline character of PAN was responsible for the appearance of two peaks at time points 17° and 21°. In the case of the PEI/PAN membrane, the characteristic peaks were identical to those of pure PAN. However, the intensity of the diffraction peak reduced as the broadness of the membrane increased significantly. PEI was able to serve as diluents in mix membranes because, in its purest form, it was amorphous.

The membranes that were fabricated have the same thickness of 200 μm as the commercial filter paper. Nevertheless, as Table 1 summarizes, their bulk resistance, ionic conductivity, porosity, and electrolyte absorption are all distinct from those of filter paper. First, the porosity value quantifies the morphologic differences as seen by SEM. Table 1 illustrates that the as-prepared PEI/PAN membrane has a porosity of 82±2%, roughly twice that of the filter paper separator (52±2%). The SEM pictures' porosity variation and porous structure are strongly connected FIG. 2. Increased ionic transport and electrolyte absorption are advantages of the increased porosity.

TABLE 1

Physical properties of prepared PEI/PAN membranes and commercial filter paper separator

| Membrane samples | Porosity. (%) | Electrolyte uptake. (%) | Thickness. (μm) | Bulk-resistance (Ω) | Ionic-conductivity- (s-cm⁻¹) ( |
|---|---|---|---|---|---|
| PEI/PAN | 82 · ± 2 | 800 ± 5 | 200 ± 5 | 2 | $5.3* \cdot 10^{-4}$ |
| Filter-Paper | 52 ± 2 | 190 ± 5 | 200 | 2.7 | $3.9* \; 10^{-4}$ |

Figure 4A:
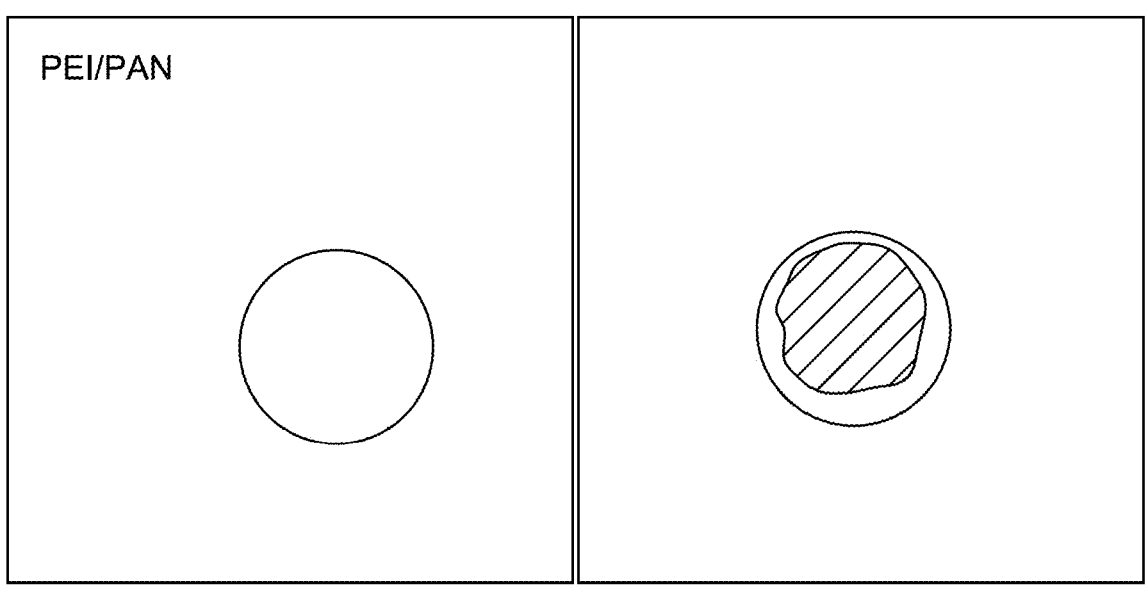
FIG. 4A is the wettability of the PEI/PAN membranes, according to certain embodiments.
Figure 4B:
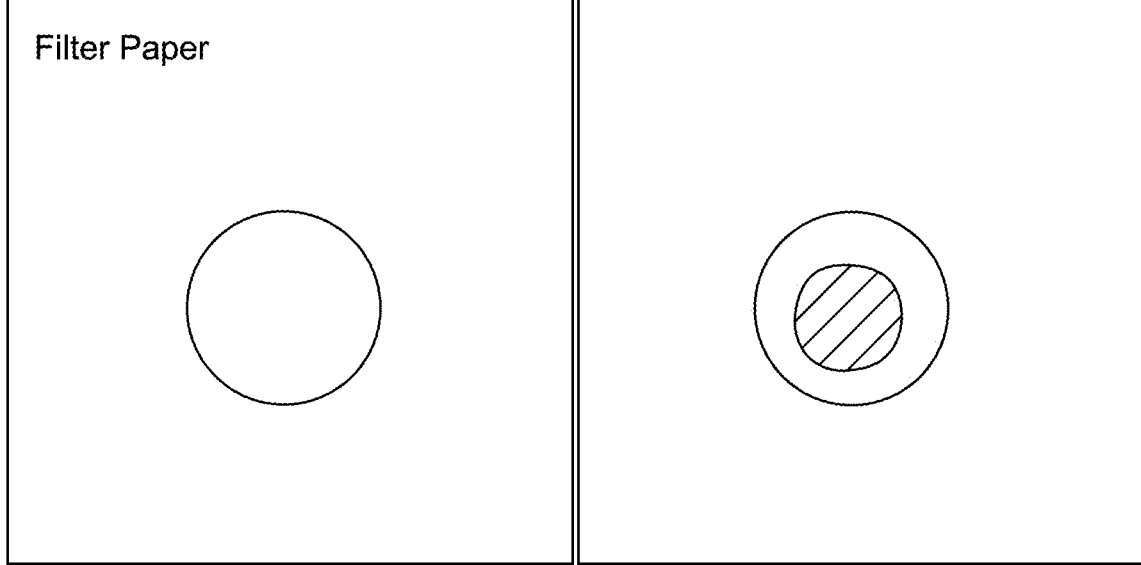
FIG. 4B is the wettability of the filter paper separator, according to certain embodiments.
Figure 4C:
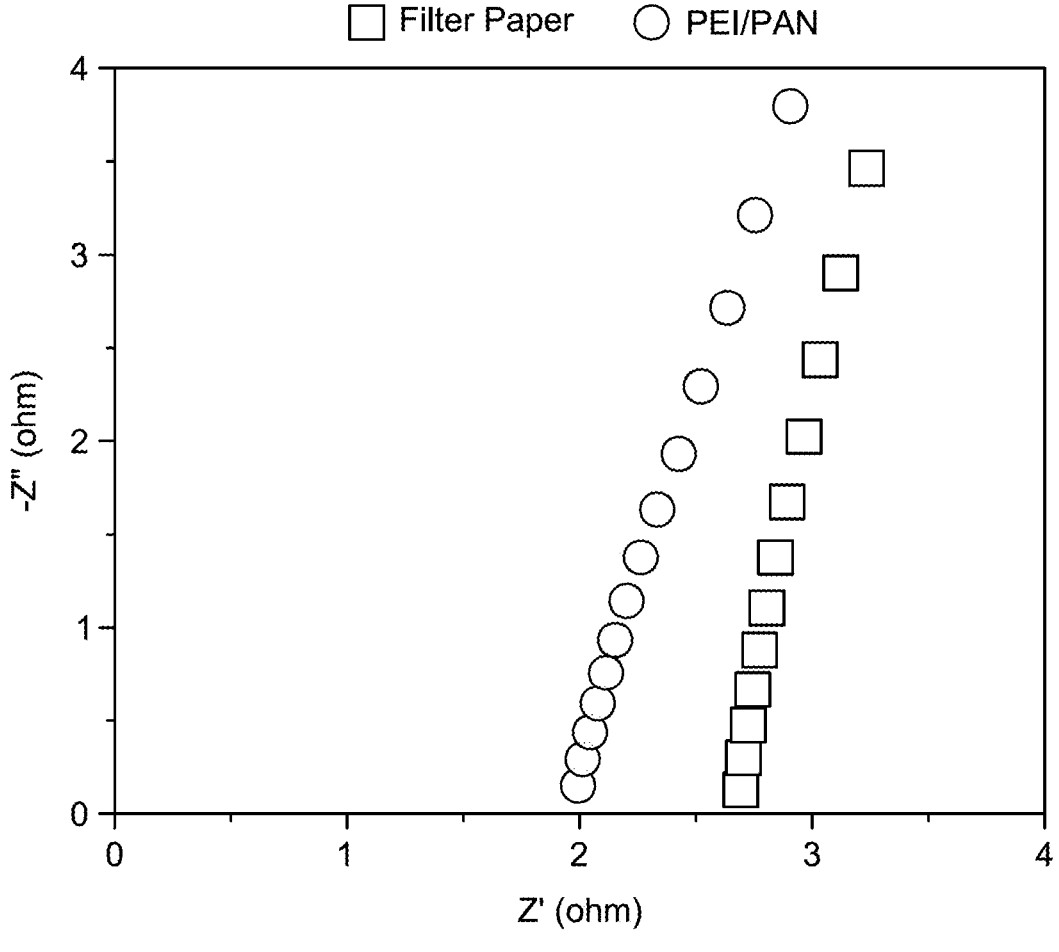
FIG. 4C is the bulk resistance of the filter paper separator and PEI/PAN membrane plotted using Nyquist, according to certain embodiments.
Figure 5:
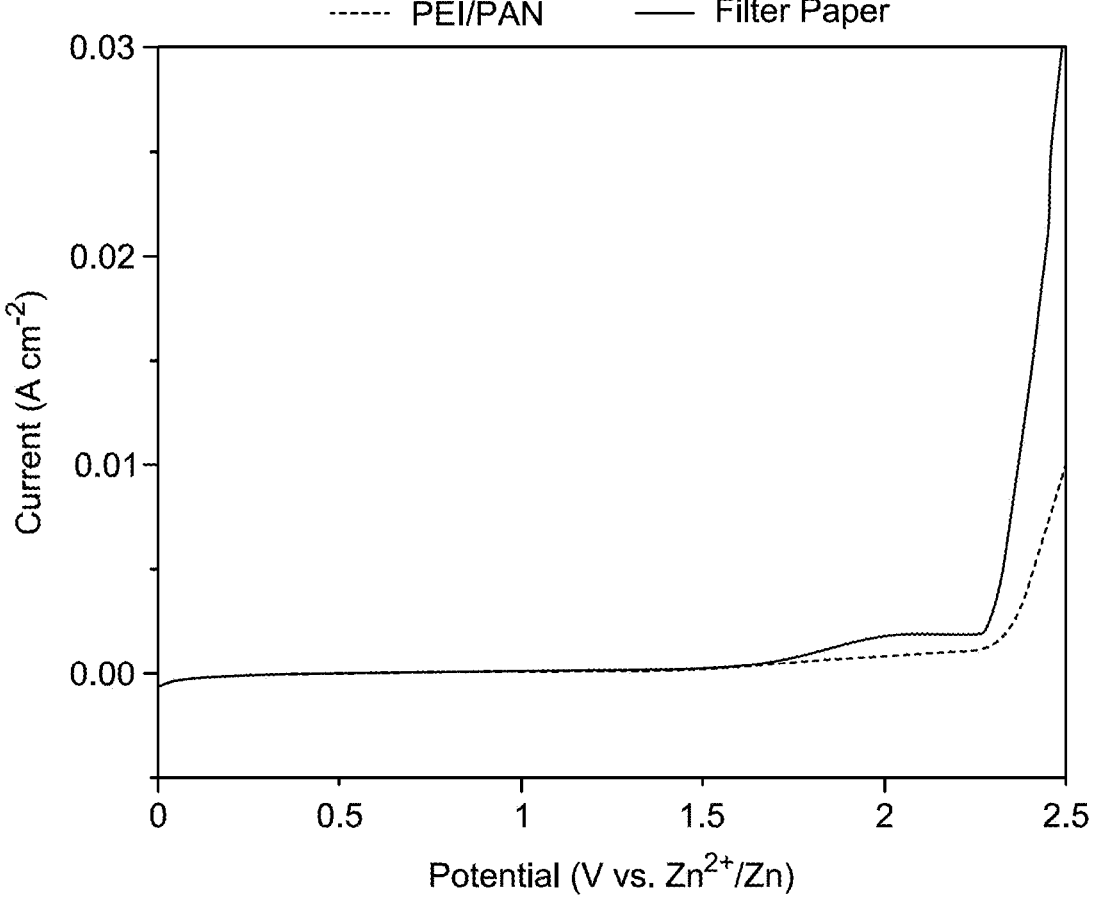
FIG. 5 is an electrochemical linear sweep voltammetry (LSV) stability of the Filter Paper and PEI/PAN membrane, according to certain embodiments.

An important metric influencing ion conductivity and electrochemical performance is electrolyte absorption. Electrolyte uptake indices were calculated after the membrane was immersed in the electrolyte for a whole day. While soaking, the electrolyte is properly absorbed and the pathways for ion movement between molecules are opened by the correct coordination of zinc ions with the functional groups of the separator. Table 1 illustrates that due to their distinct porous structure, PEI/PAN membranes exhibit a greater electrolyte rate (800±5) absorbance than filter paper (190±5). The wettability test helps to visualize this better (FIGS. 4A-B) Photographs were obtained five seconds after a specific quantity of electrolyte droplets were applied to the membranes' top surface. It took the electrolyte less than two seconds to spread throughout the whole PEI/PAN membrane (FIG. 4A). But it remained on the Filter Paper for a very long period (FIG. 4B). The enhanced wettability and affinity of the PEI/PAN porous membrane are due to the connected porous nanofiber structure. The membranes' better wetting properties were mainly caused by their large porosity and greater affinity for the electrolyte. A stable and uniform ion diffusion condition can be created via increased electrolyte absorption, allowing for ion transit and ultimately enhancing ionic conductivity and electrochemical properties. In addition, ionic conductivity of both membranes was determined using bulk resistance measured by the EIS tests. (FIG. 4C). The PEI/PAN membranes' ionic conductivity ($5.3*10^{-4}$ S cm⁻¹) is superior to that of the filter paper ($3.94*10^{-4}$ S cm⁻¹) (Table 1). The PEI/PAN membrane exhibits a favorable ionic conductivity, indicating that the high electrolyte absorption results from interactions in chemical coordination and the interconnecting nanoscale pore structure. This contributes significantly to the quick reaction dynamics of the membrane. The electrochemical stability window is essential in AZIBs to ensure the charge/discharge voltage and is evaluated by LSV. The PEI/PAN membranes can be seen from the curve to be highly resistive to 2.2 V vs. $Zn^{2+}/Zn$, with higher performance than the Filter Paper, indicating the PEI/PAN membranes yet have slightly higher electrochemical stability (FIG. 5) These findings show that the PEI/PAN membrane is robust with the AZIBs and can therefore completely meet the needs of a batteries-based on high-energy Zn metal anode.

Figure 6A:
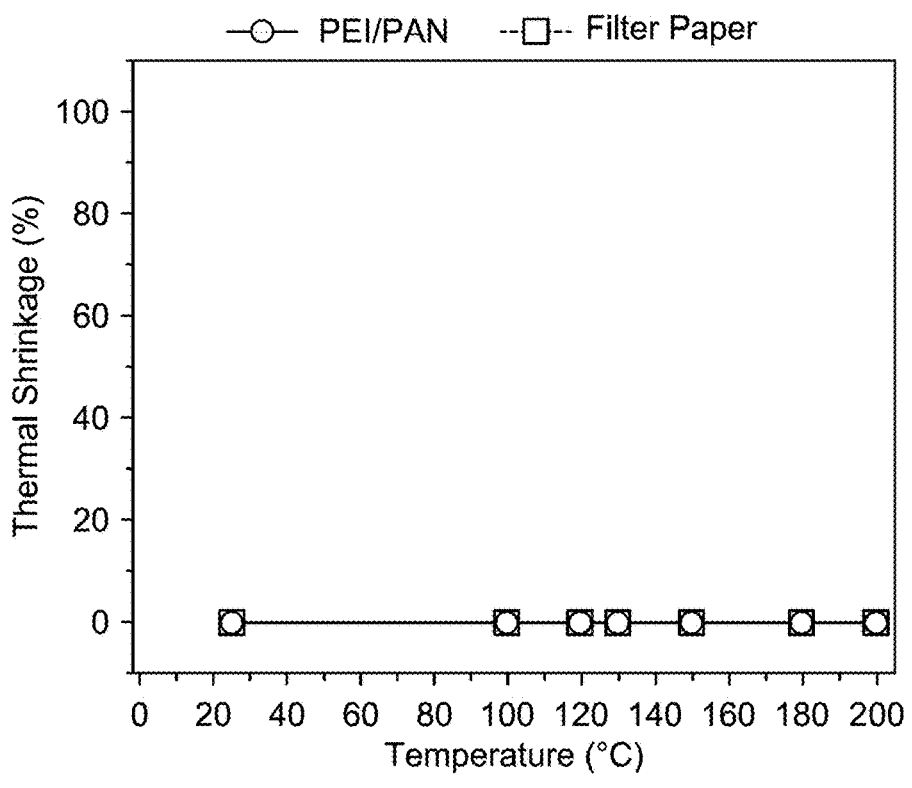
FIG. 6A is the thermal properties of membranes showing the thermal shrinkage of filter paper and PEI/PAN membrane, according to certain embodiments.
Figure 6B:
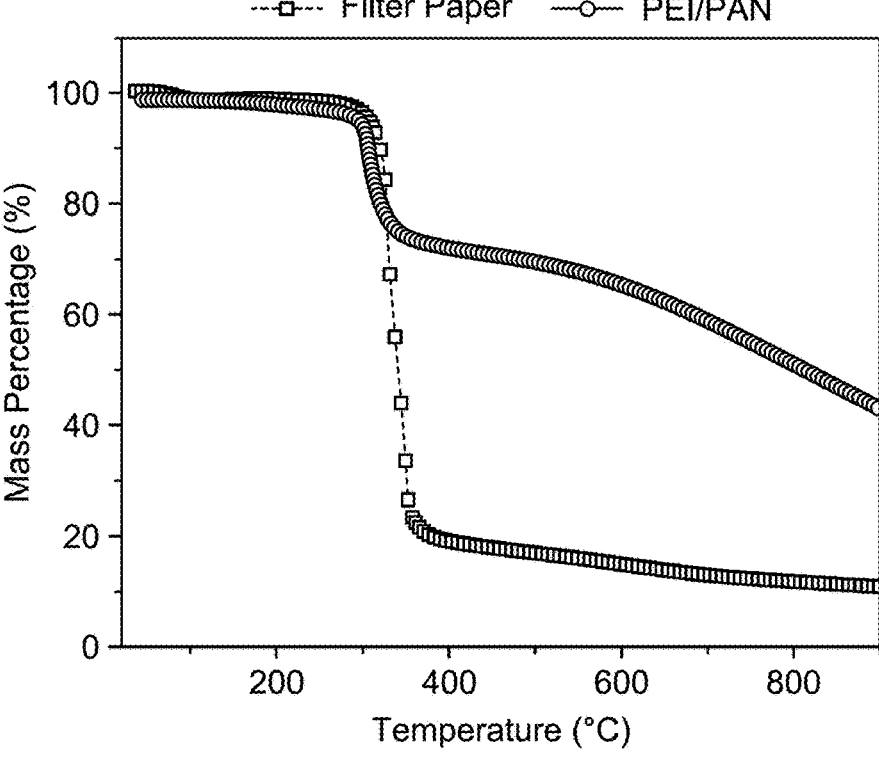
FIG. 6B is thermogravimetric analysis (TGA) curves of Filter Paper and PEI/PAN membrane, according to certain embodiments.

The safety of batteries depends on the membrane's thermal stability, which is assessed using thermal shrinkage and TGA (FIG. 6). After an hour of storage, the membrane's dimensional change at numerous temperatures (25-200° C.) was tracked to examine the thermal dimensional stability (FIG. 6A). At temperatures as high as 200 degrees Celsius, both samples displayed remarkable stability in dimensions. In addition, these samples were placed for TGA analysis temperatures ranging from 50-800° C. The thermal properties of PAN/PEI, as evaluated by TGA, revealed that the degradation of the composite membranes occurred in three steps. This was shown by the fact that the degradation occurred (FIG. 6B). In the first step, the water that was linked to the membrane vaporized at temperatures ranging from 30 to 300° C. A breakdown of the branching chain in the second step of PAN and PEI occurred at 340-410° C., while the third step of polymer backbone breakdown occurred at 450-800° C. The findings indicated that the breakdown temperature of PAN/PEI is 316° C. In contrast, filter paper showed signs of deterioration in the two phases. The first range, from 50 to 150° C., is linked to a mass loss of about 5%. The evaporation of the water that was still present in the filter paper was the cause of the loss. The temperatures in the range of 200 to 400° C. were blamed for the breakdown of the cellulose skeleton. We found that 7% of the residues from Filter Paper and 40% of the residues from PEI/PAN were stable at 750° C. All of the aforementioned studies point to PEI/PAN membranes' exceptional heat stability, which might greatly enhance AZIBs' safety performance.

Figure 7A:
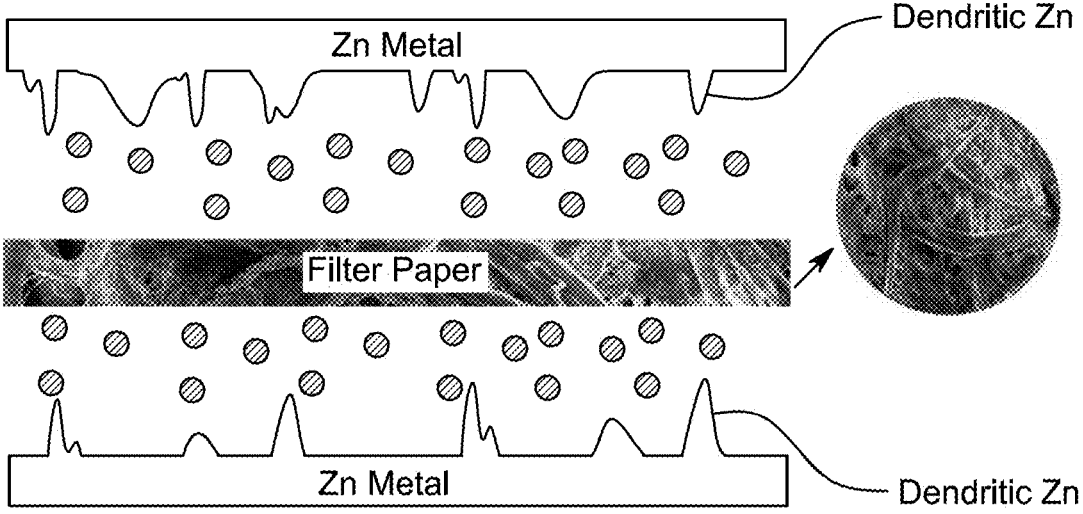
FIG. 7A is the schematic illustration of Zn/Filter Paper/Zn coin cell, according to certain embodiments.

As FIG. 7A shows, homogeneous $Zn^{2+}$ plating can be achieved by using PEI/PAN with high porosity and small, uniform pore diameters, which inhibits the formation of Zn dendrites. The electrospun nanofibers' ability to create well-connected, densely dispersed, and mechanically reinforced highways for ionic transport would aid in lowering the concentration of local current, thus facilitating a more uniform $Zn^{2+}$ flux.

Figure 7B:
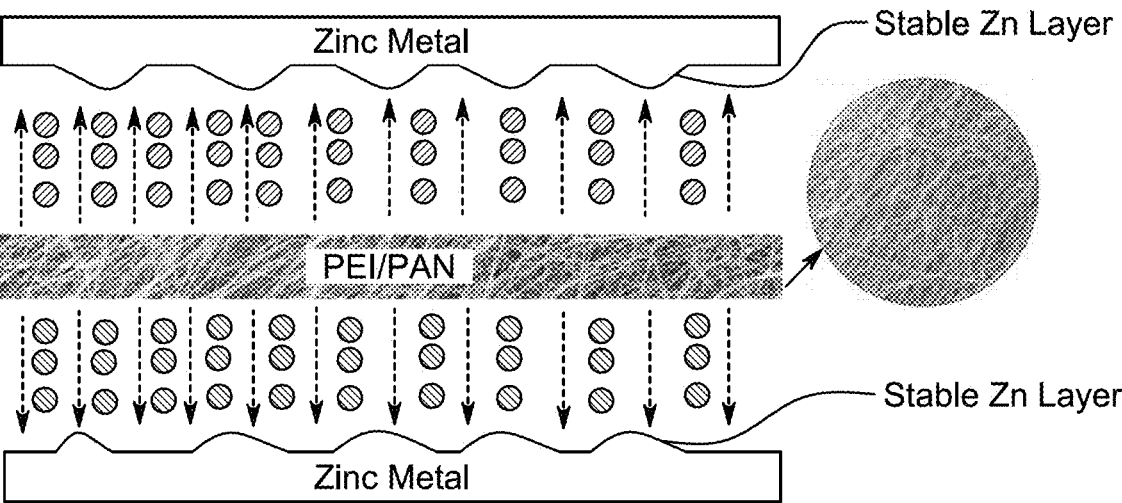
FIG. 7B is the schematic illustration of symmetrical Zn/PEI/PAN/Zn, according to certain embodiments.
Figure 7C:
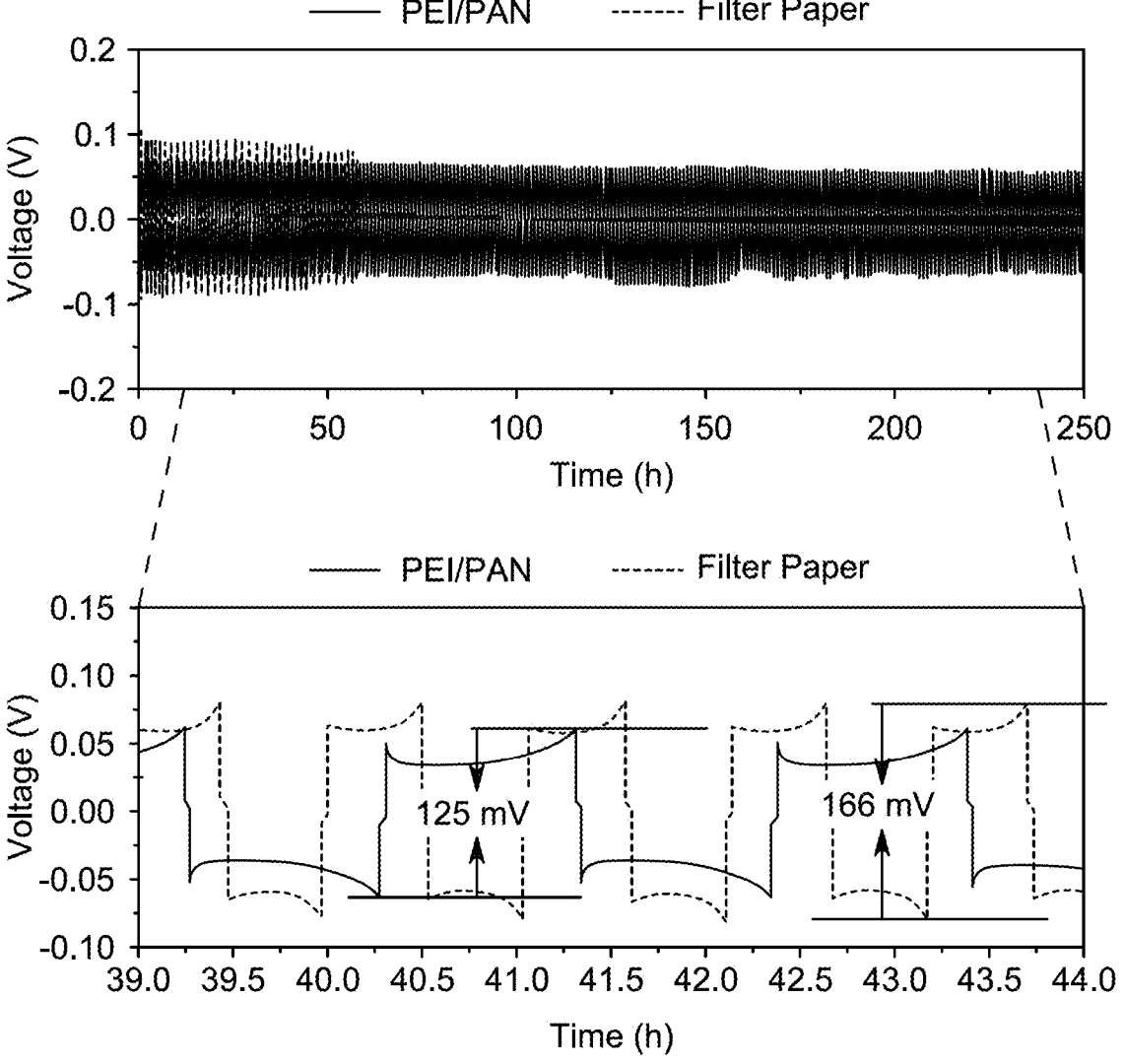
FIG. 7C is the cycling performance of symmetrical Zn/PEI/PAN/Zn and the Zn/Filter Paper/Zn coin cell at a current density 3 mA $cm^{-2}$ current density and 1.5 mAh $cm^{-2}$ specific capacity, according to certain embodiments.
Figure 8A:
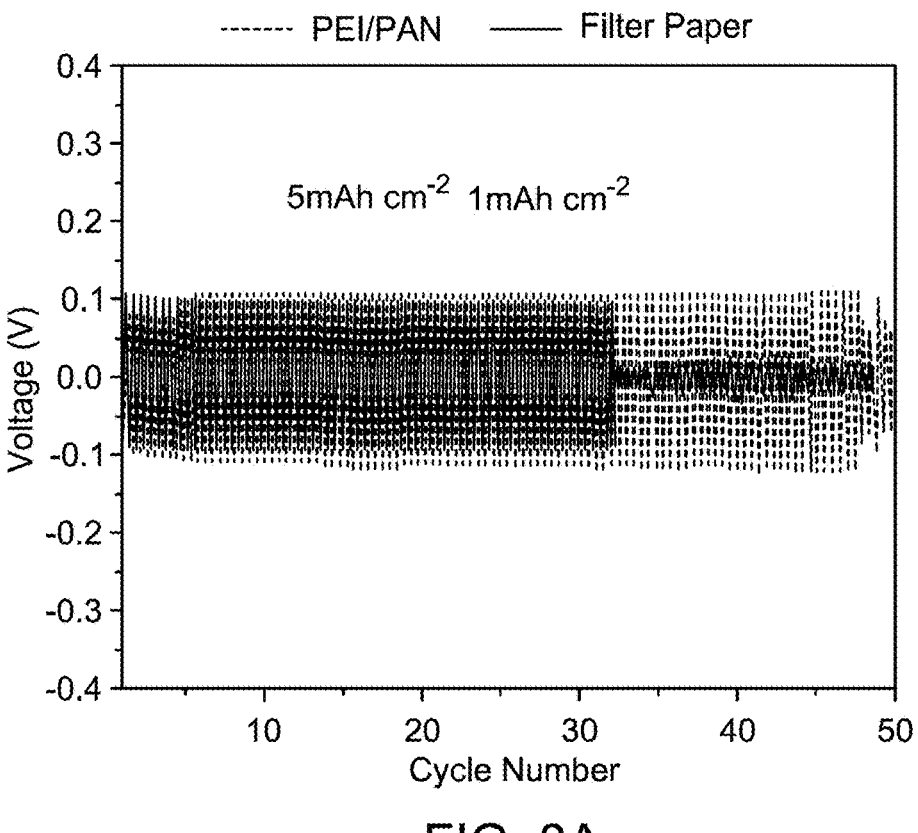
FIG. 8A is the cycling performance of symmetrical Zn|Zn battery coin cells depend on Filter Paper and PEI/PAN at high current density 5 mA $cm^{-2}$ and capacity of 1 mAh $cm^{-2}$, according to certain embodiments.
Figure 8B:
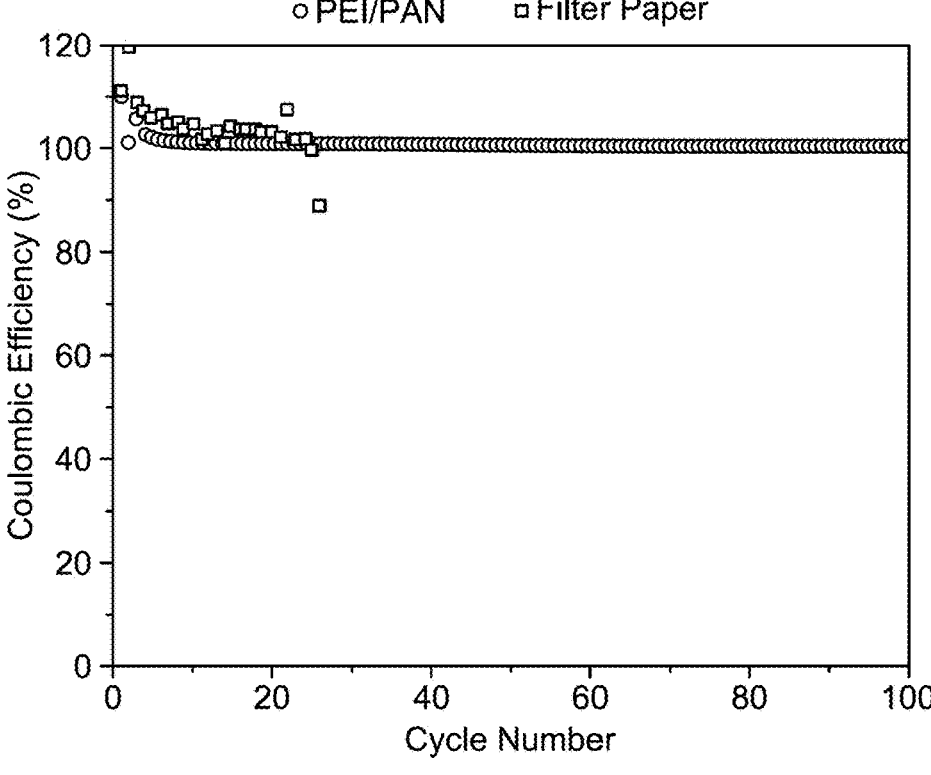
FIG. 8B is the electrochemical Zn|Cu cycling performances of the Filter Paper and PEI/PAN membrane-based cells, according to certain embodiments.
Figure 9A:
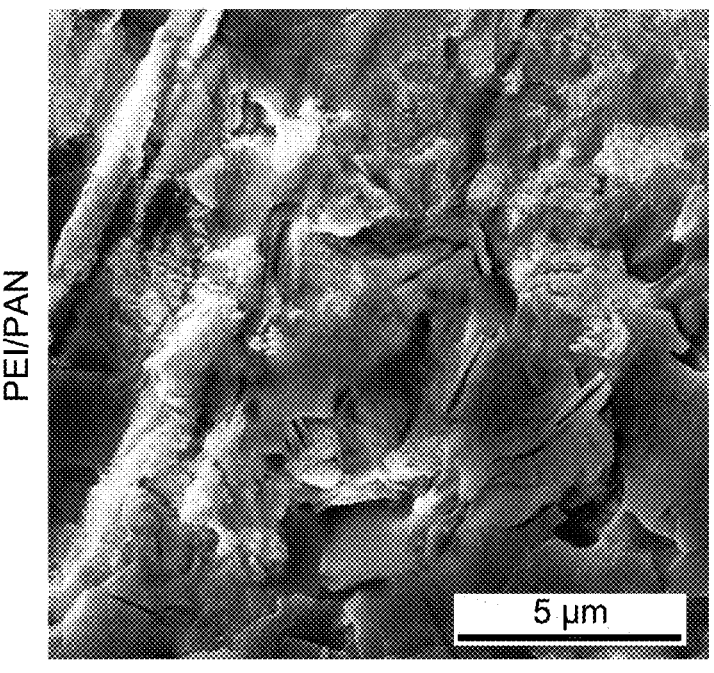
FIG. 9A is top surfaces SEM images of Zn metal using PEI/PAN membrane at 3 mA $cm^{-2}$ current density and 1.5 mAh $cm^{-2}$ capacity at different magnifications after 800 hours at 5 μm magnification, according to certain embodiments.
Figure 9B:
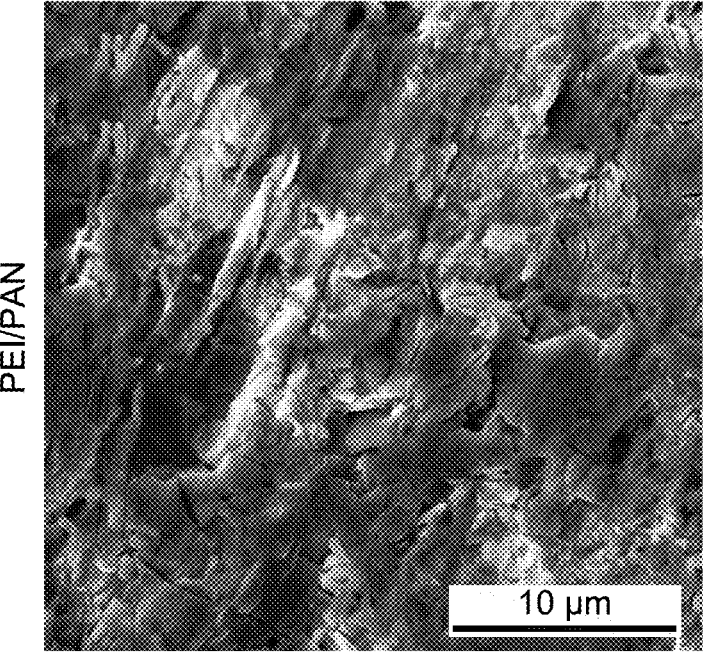
FIG. 9B is top surfaces SEM images of Zn metal using PEI/PAN membrane at 3 mA $cm^{-2}$ current density and 1.5 mAh $cm^{-2}$ capacity at different magnifications after 800 hours at 10 μm magnification, according to certain embodiments.
Figure 9C:
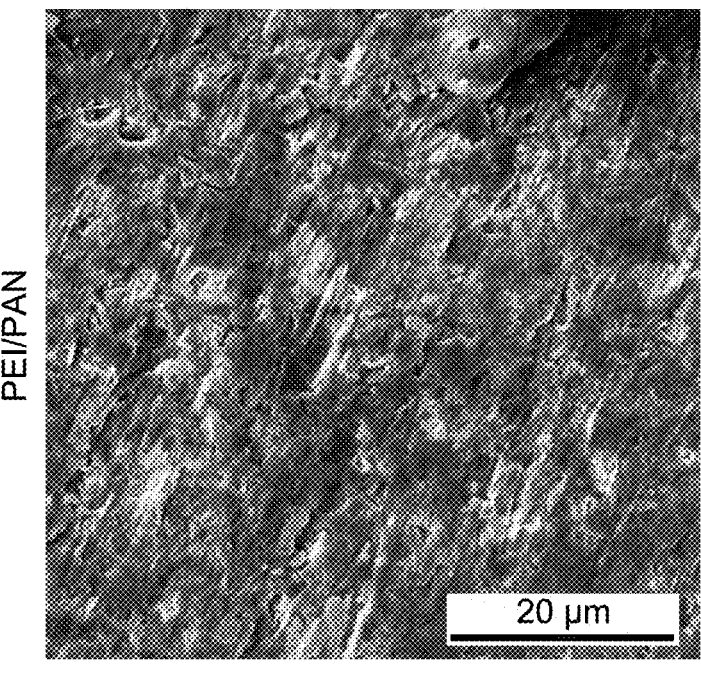
FIG. 9C is top surfaces SEM images of Zn metal using PEI/PAN membrane at 3 mA $cm^{-2}$ current density and 1.5 mAh $cm^{-2}$ capacity at different magnifications after 800 hours at 20 μm magnification, according to certain embodiments.
Figure 9D:
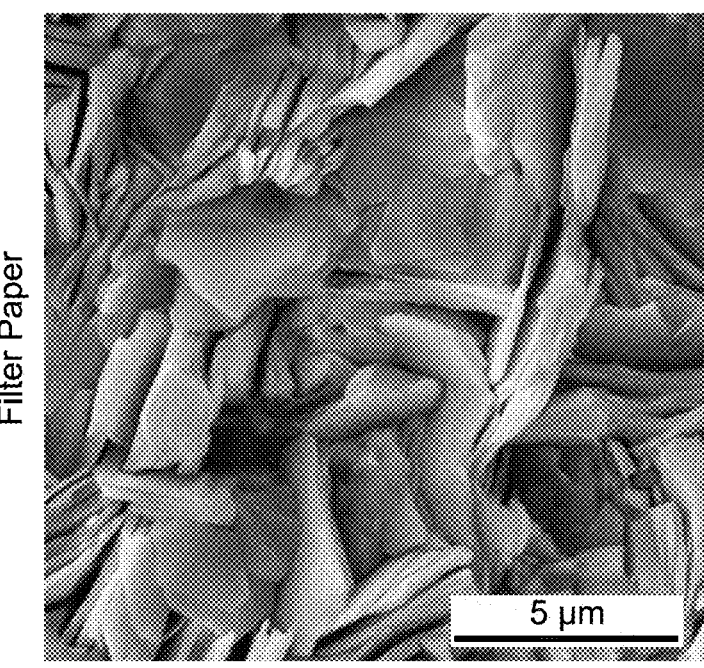
FIG. 9D is top-view SEM images of Zn metal using Filter Paper separator at 3 mA $cm^{-2}$ current density and 1.5 mAh $cm^{-2}$ capacity at different magnifications after 800 hours at 5 μm magnification, according to certain embodiments.
Figure 9E:
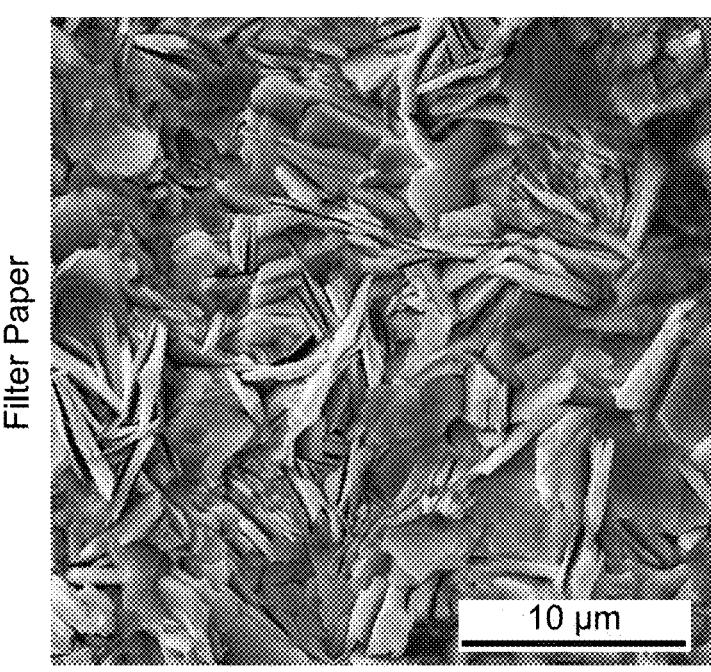
FIG. 9E is top-view SEM images of Zn metal using Filter Paper separator at 3 mA $cm^{-2}$ current density and 1.5 mAh $cm^{-2}$ capacity at different magnifications after 800 hours at 10 μm magnification, according to certain embodiments.
Figure 9F:
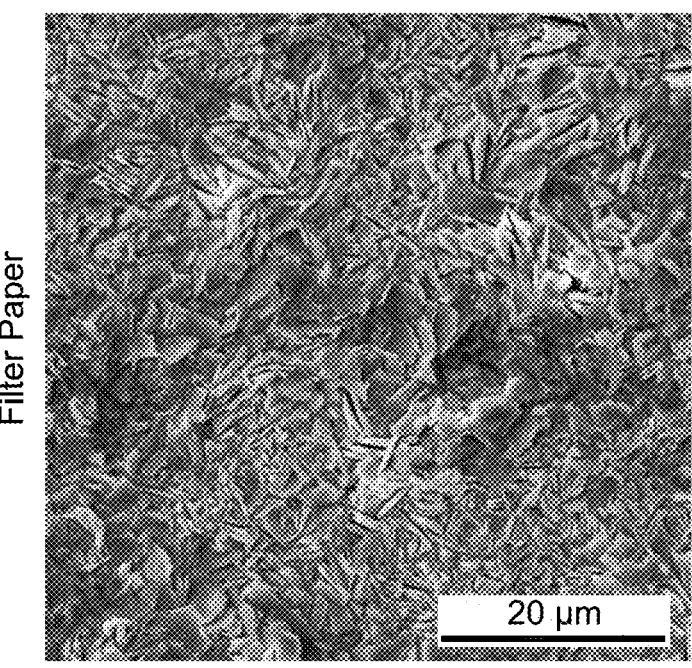
FIG. 9F is top-view SEM images of Zn metal using Filter Paper separator at 3 mA $cm^{-2}$ current density and 1.5 mAh $cm^{-2}$ capacity at different magnifications after 800 hours at 20 μm magnification, according to certain embodiments.

Additionally, zinc stripping and plating under galvanostatic circumstances were studied utilizing symmetric Zn/Zn cells with filter paper and PEI/PAN membrane to quantify the cyclic stability of the zinc foil anode. FIG. 7B depicts Zn/Zn symmetric cell cycling stability using filter paper and PEI/PAN at 3 mA $cm^{-2}$ current density and 1.5 mAh $cm^{-2}$ specific capacity. The Zn/Zn symmetric cell with filter paper separator abruptly lowers in voltage after 60 hours, indicating a short circuit. Conversely, the PEI/PAN membrane demonstrated 250 hours of cycling stability without indicating a short circuit or aberrant cycling behavior. These findings indicate that, when compared to other filter paper, PEI/PAN membranes can exhibit a significantly longer lifespan and are best suited for improving cyclic stability. Symmetric cells with PEI/PAN membranes have 125 mV voltage hysteresis over the first 39-44 hours, compared to filter paper (166 mV) (FIG. 7C). Amazingly, durable Zn plating/stripping performance of greater than 50 h could be yet obtained at an incredibly higher current density (5 mA $cm^{-2}$) and capacity (1 mAh $cm^{-2}$) for PEI/PAN membrane-based symmetric cells (FIG. 8A). In contrast, the Filter Paper dependent cells cannot be cycled efficiently at this condition. This indicates easy plating or striping Zn, which improves homogeneous Zn deposition and Zn anode cycle stability. Moreover, Zn|Cu cells were assembled to study further the effect of the interaction of PEI/PAN on the ultra-long-time stability of Zn metal plating/stripping actions. At high current density and capacity (1.0 mA $cm^{-2}$, 1 mAh $cm^{-2}$), the coulombic efficiency of the Zn|Cu cells was measured. We can see from FIG. 8B that the coulombic efficiency of the cells with PEI/PAN membrane was very stable, sustaining above 99% for over 100 cycles. In comparison, the coulombic efficiency of the Filter Paper reached above 100% for the first few cycles and then steadily decreased. The coulombic efficiency of the Filter Paper based cell fell after 25 cycles and has much worse electrochemical cycling features, with dramatically varying coulombic efficiencies during the cycles.

Figure 7D:
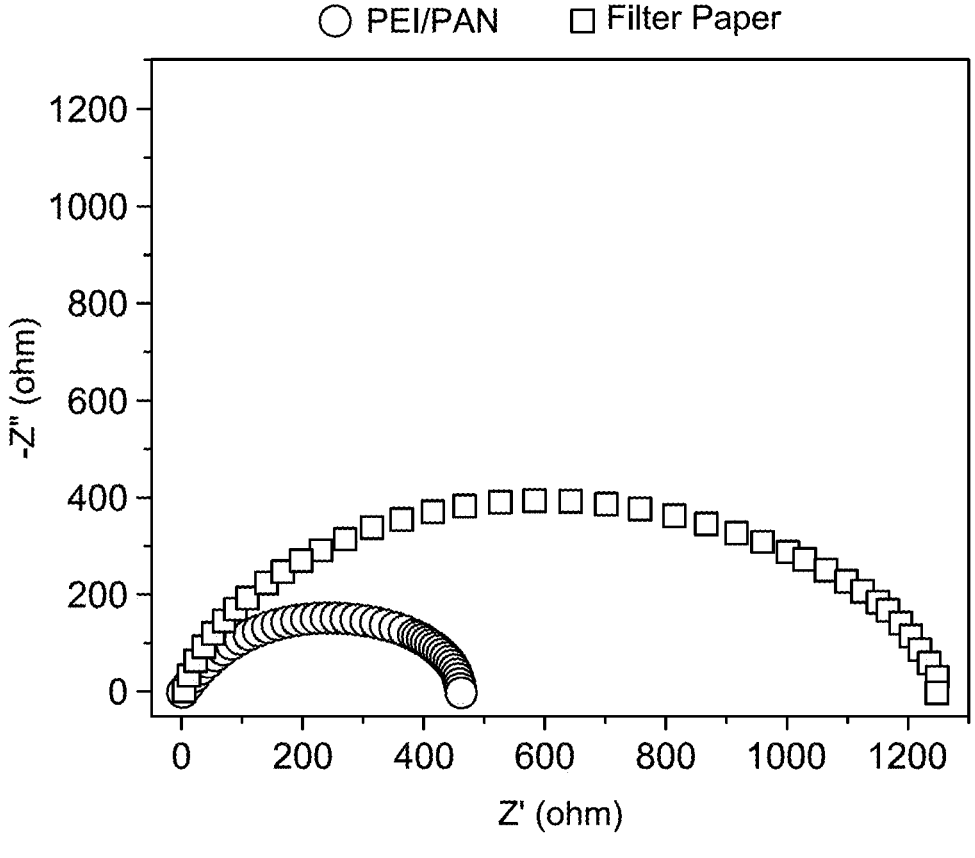
FIG. 7D is the Nyquist plot of Filter paper and PEI/PAN membrane, according to certain embodiments.

The EIS is assessed to look into the impact of the PEI/PAN on the reaction kinetics in more detail (FIG. 7D). The remarkable performance indicates that the PEI/PAN may effectively reduce the interfacial resistance to facilitate the rapid migration of $Zn^{2+}$, in line with the findings on physical characteristics.

The morphologies of the Zn anode surface after 800 hours of cycling were investigated to explain Zinc battery featuring PEI/PAN membranes extended cycling stability (FIG. 9). After 800 hours of cycling, the battery with a filter paper separator appears to have dendrites and passivation on the zinc anode, and many byproducts cover various regions of the battery (FIGS. 9D-F). In addition to progressively accelerating the growth of dendrites, the formation of byproducts, and the consumption of electrolytes, the uneven galvanized layer exacerbates the unevenness of its ion concentration and electric field distribution. These elements may eventually pierce through the battery separator, resulting in an internal short circuit. The Zn metal anode in the battery with PEI/PAN displays a fair amount of smoothness and flatness during cycling (FIGS. 9A-C). The flakes are visible because they are tightly packed in layers with little room between them. The substantial polar functional groups can provide high-concentration functional sites for the efficient adhesion and homogeneous distribution of Zn ions at the molecular level. As for the interaction between the PEI/PAN membrane and the 2 M $ZnSO_4$ electrolyte, the important point is the existence of polar groups in polymer chains. The polar bonds in polymer chains may strengthen the interaction between the separators and the high-polar electrolyte. Atoms with polar functional groups in the PEI/PAN membrane are better at homogenizing the electric field distribution than those in regular filter paper. Thus, the membrane promotes homogenous ion deposition in the zinc negative electrode, preventing zinc dendrite formation. This arrangement allows for an exceptionally long battery life, as demonstrated above.

Figure 10A:
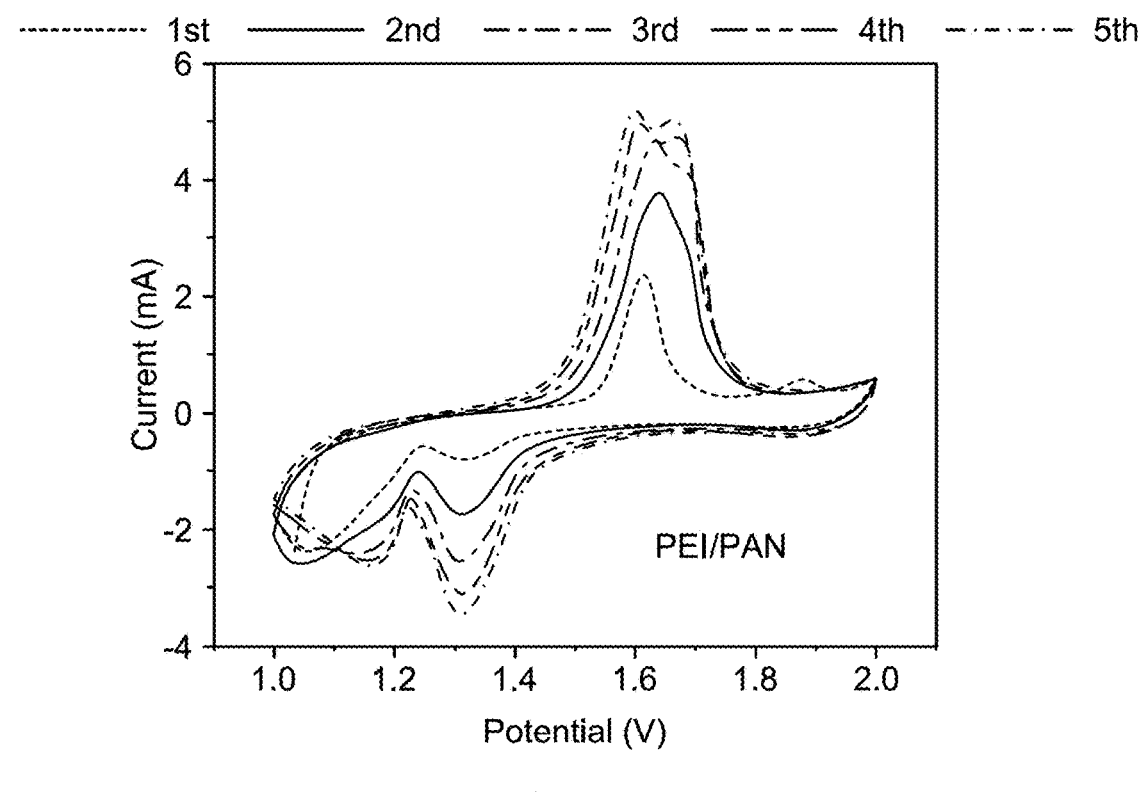
FIG. 10A is cyclic Voltammetry (CV) curve for the first five cycles were measured from 0.2 to 1.8 V of PEI/PAN membrane, according to certain embodiments.
Figure 10B:
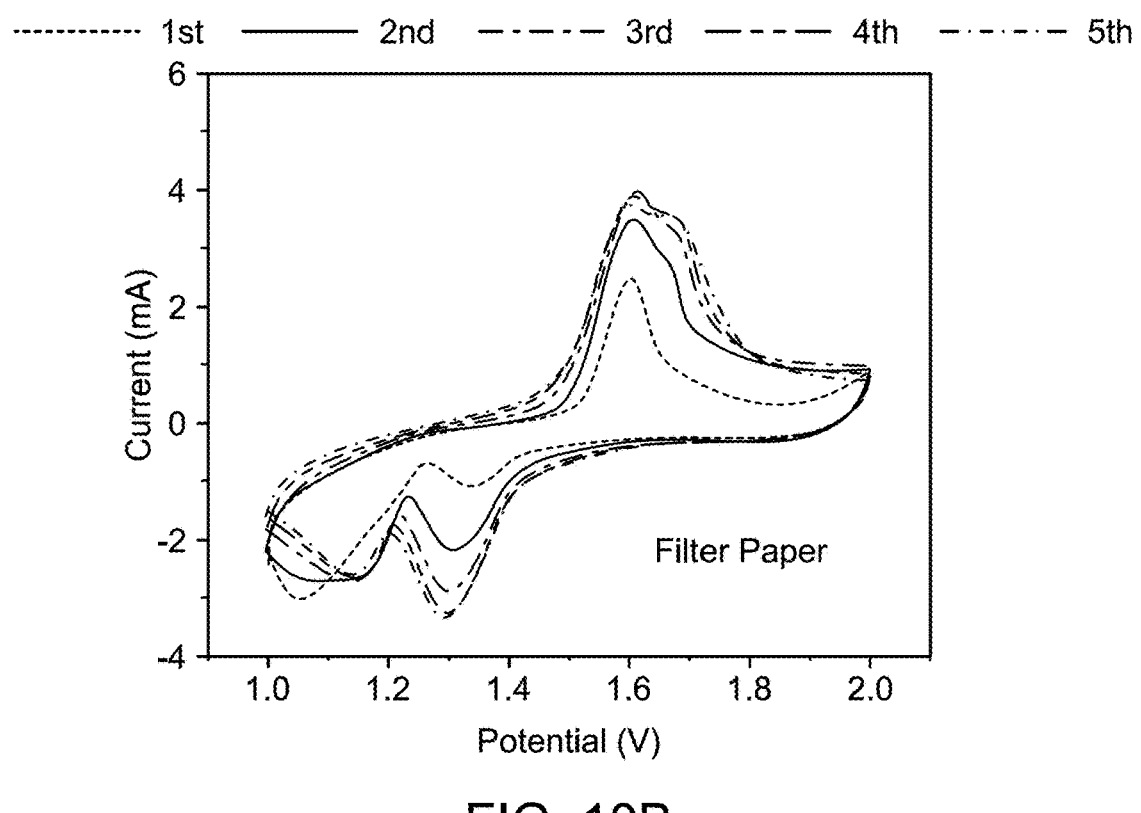
FIG. 10B is the CV curve for the first five cycle were measured from 0.2 to 1.8 V of filter paper separator, according to certain embodiments.
Figure 10C:
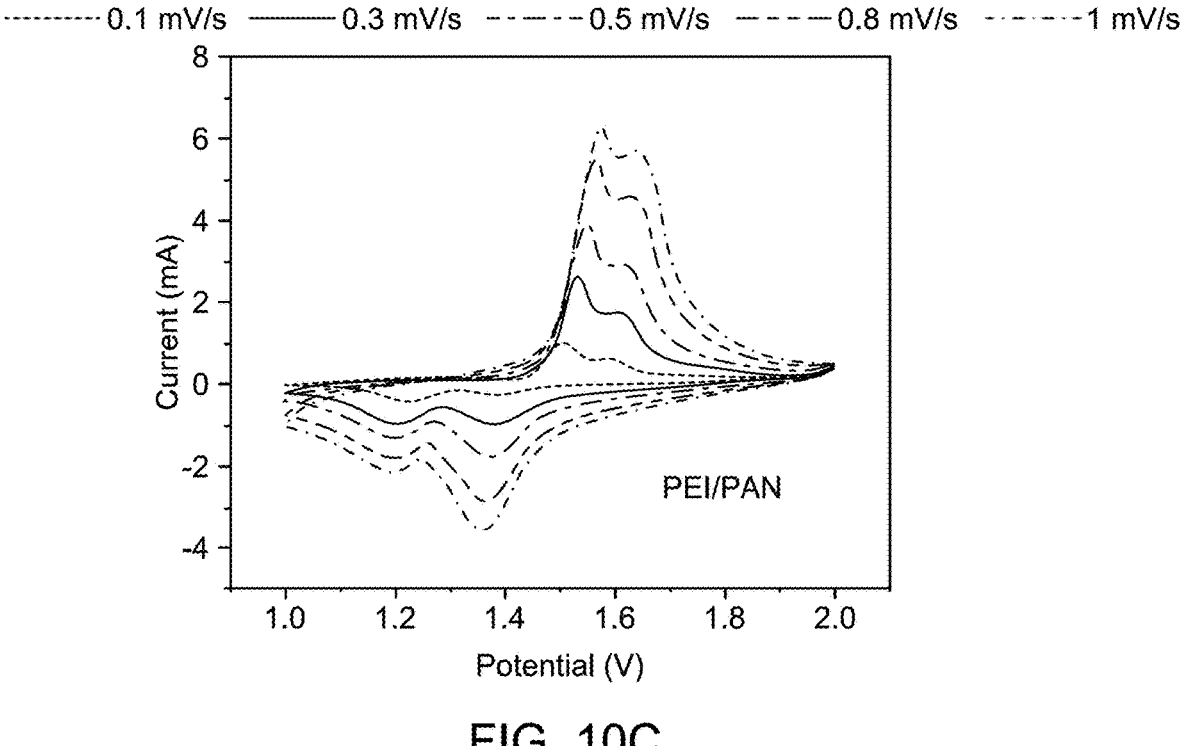
FIG. 10C is the CV curves of AZIBs at scan rates of 0.1, 0.3, 0.5, 0.8, and 1 mv $s^{-1}$ of PEI/PAN membrane, according to certain embodiments.
Figure 10D:
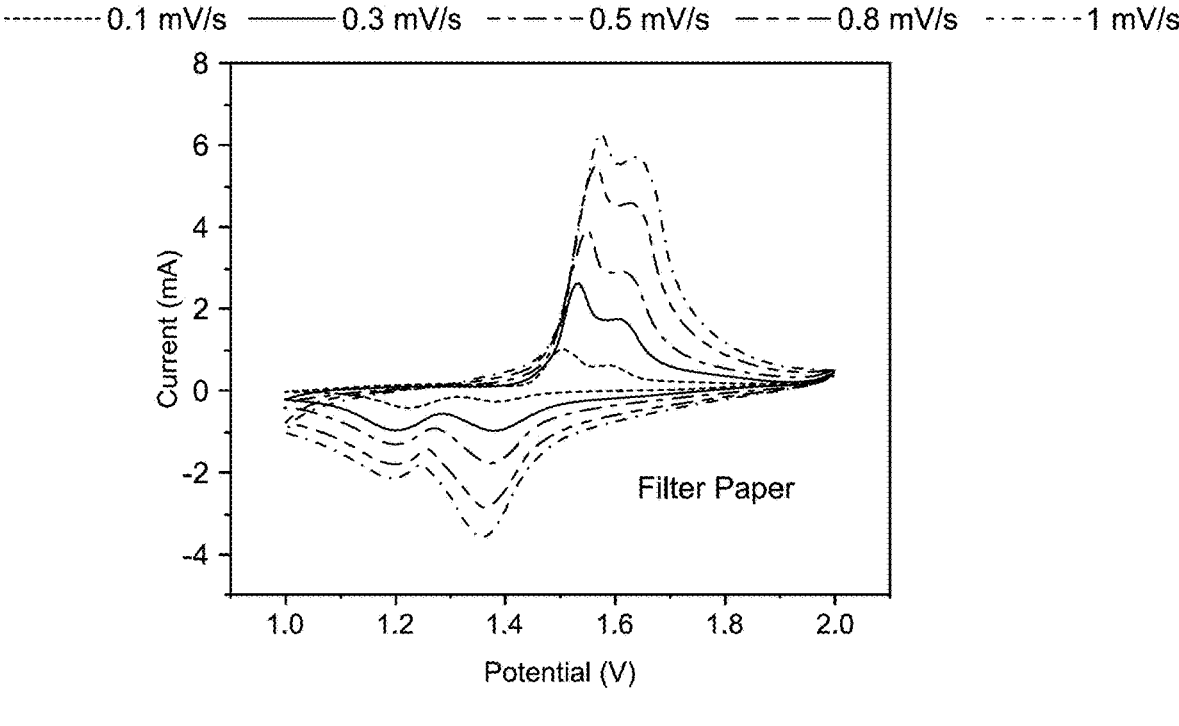
FIG. 10D is the CV curves of AZIBs at scan rates of 0.1, 0.3, 0.5, 0.8, and 1 mv $s^{-1}$ of filter paper separator, according to certain embodiments.
Figure 10E:
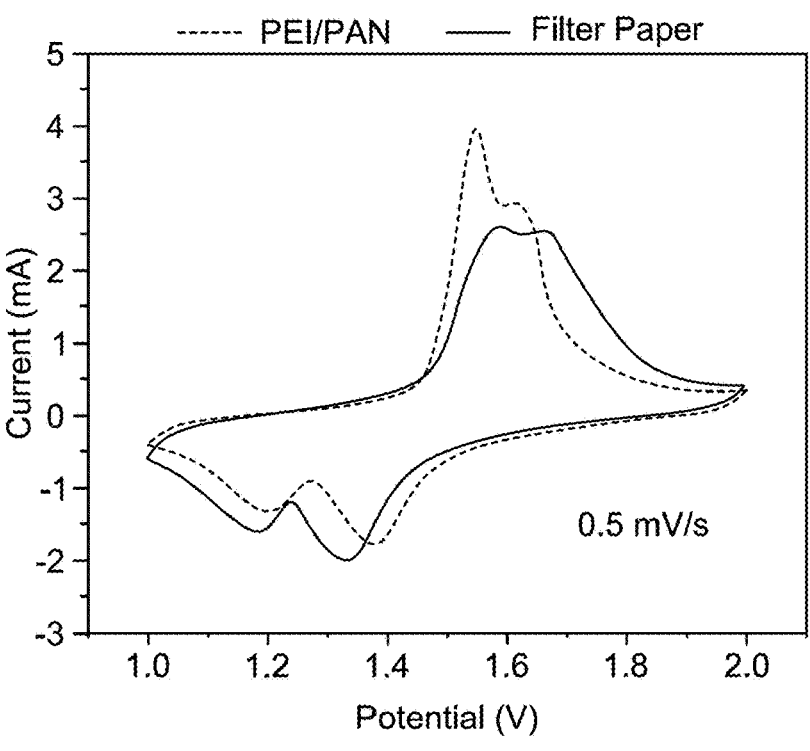
FIG. 10E is the CV curves of AZIBs at scan rates of 0.5 mv $s^{-1}$, according to certain embodiments.
Figure 10F:
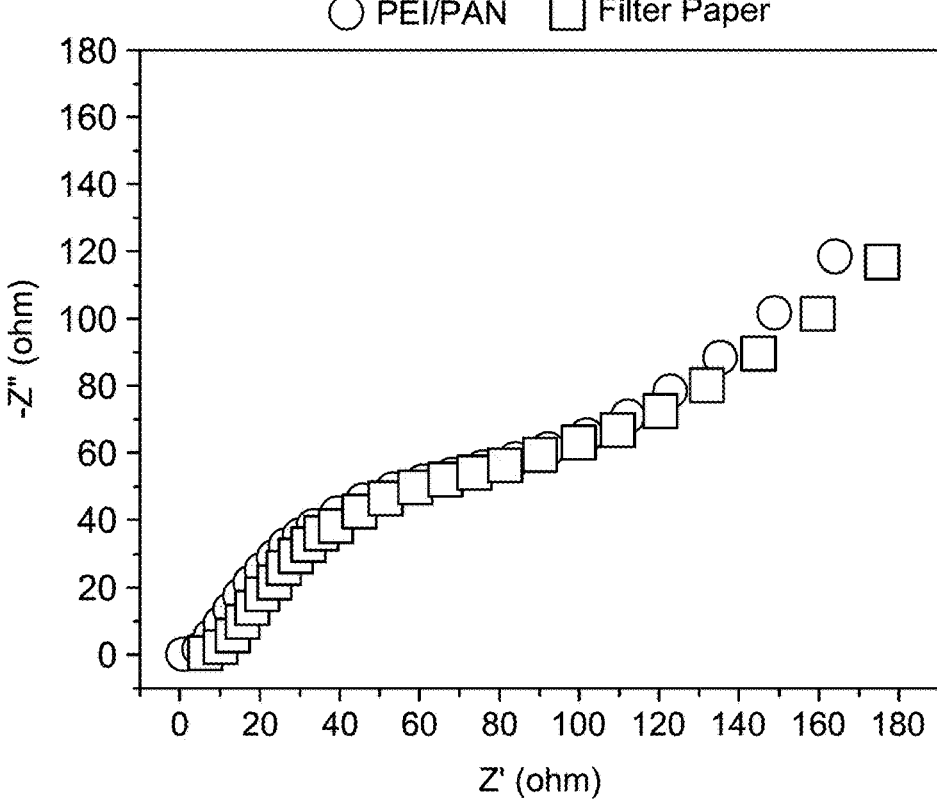
FIG. 10F is illustrations using the Nyquist EIS of the prepared membrane and the commercial filter paper separator, according to certain embodiments.
Figure 10G:
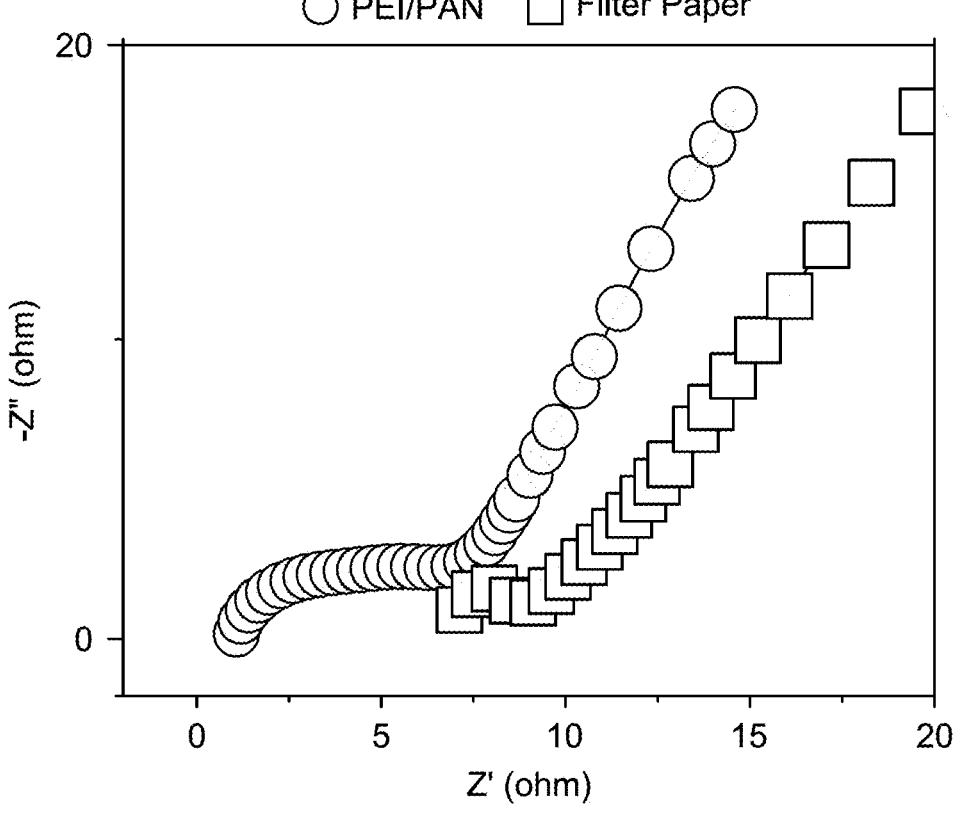
FIG. 10G is illustrations using the Nyquist EIS of the prepared membrane and the commercial filter paper separator, according to certain embodiments.

Full batteries with commercial filter paper separators and fabricated PEI/PAN membrane were built to gain a deeper understanding of the pore effects of separators in real-world applications. The membrane-containing cells' CV curves were examined (FIGS. 10A-B). According to earlier reports, all systems exhibit comparable redox peaks corresponding to Mn-ion redox processes. More redox dynamics are seen in the Zn/PEI/PAN/$MnO_2$ cells compared to the Zn/Filter Paper/$MnO_2$ system, as seen by the larger peak current and a smaller potential difference between redox peaks. In addition, the PEI/PAN membrane has a comparatively bigger integrated area, indicating a higher specific capacity. This indicates that PEI/PAN's smaller pore size does not impair conductivity or reaction kinetics, as previously demonstrated by its excellent ionic conductivity and electrolyte absorption. CV of AZIBs with various separators was analyzed at scan rates of 0.1, 0.3, 0.5, 0.8, and 1 mv $s^{-1}$ to evaluate electrochemical stability (FIGS. 10C-E). It was observed that AZIBs with Filter Paper separators showed altered CV curves. However, rectangular AZIB CV bends with PEI/PAN separators demonstrated a quick voltage-dependent current response, representing high-rate effectiveness. Additionally, the Zn/PEI/PAN/$MnO_2$ and the Zn/Filter Paper/$MnO_2$ coin cell were also analyzed by EIS (FIG. 10F); both batteries demonstrated a semicircle in the high-frequency region. PEI based batteries have lower charge transfer resistance ($R_{ct}$) at the electrode/electrolyte contact than filter paper batteries after probing via the analogous circuit. This indicates that the reaction polarization in the batteries assembled with PEI/PAN was lower. It is reasonable to anticipate improved battery performance from batteries constructed with PEI/PAN membranes due to their steady electrochemical kinetics and less polarization.

Figure 11A:
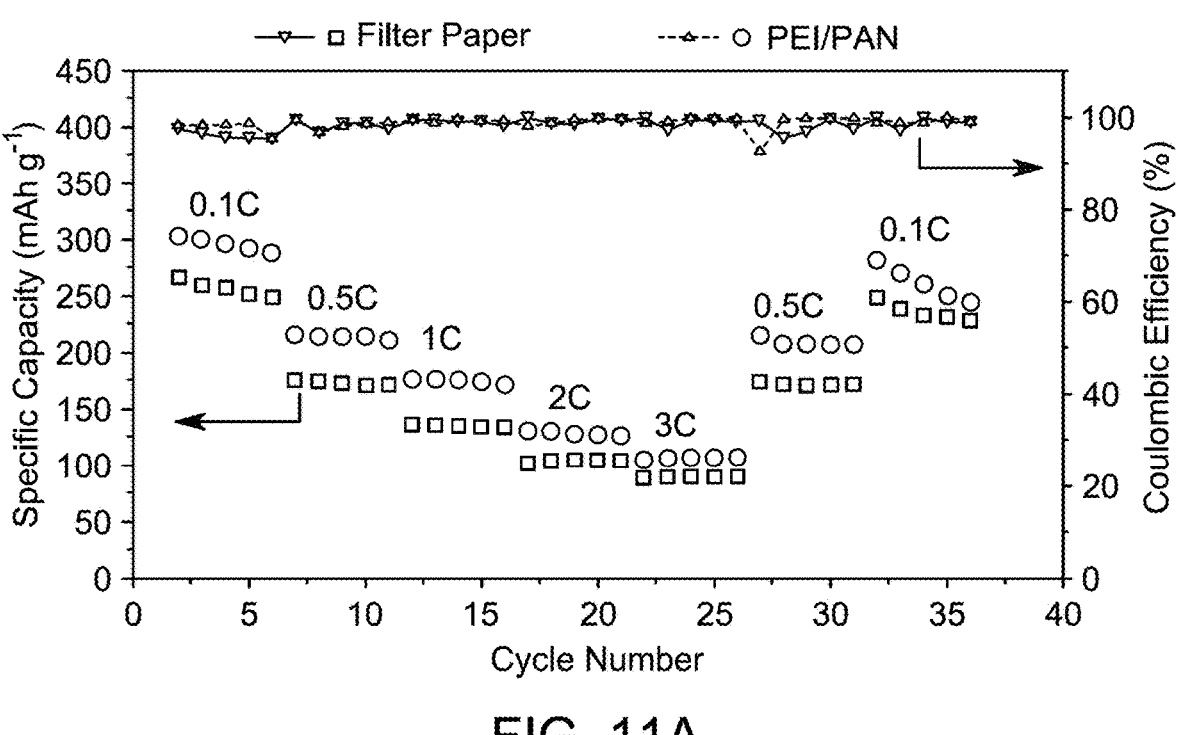
FIG. 11A is the rate performance of the Zn/MnO₂ batteries with prepared membrane and commercial Filter Paper separator within a range of 0.1-3C current rates, according to certain embodiments.
Figure 11B:
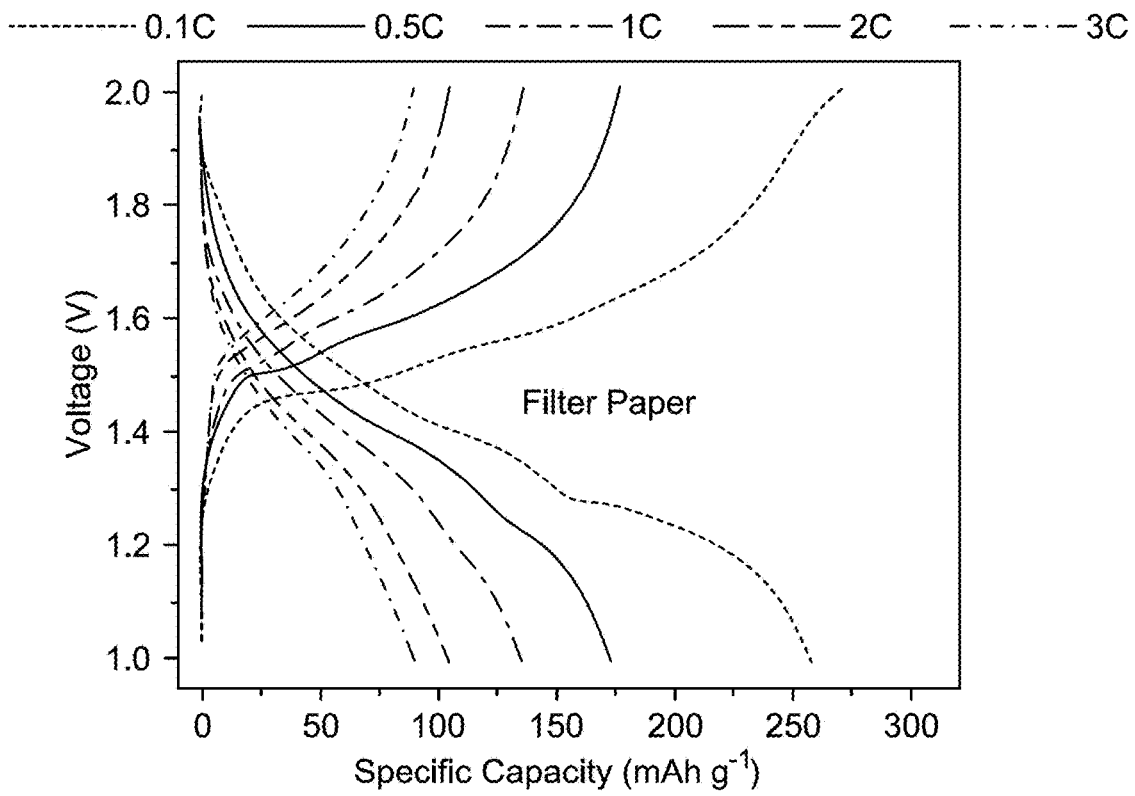
FIG. 11B is the charge/discharge patterns of the batteries assembled with Zn/Filter Paper/MnO$_2$ at various C-rate values from 0.1 to 3C, according to certain embodiments.
Figure 11C:
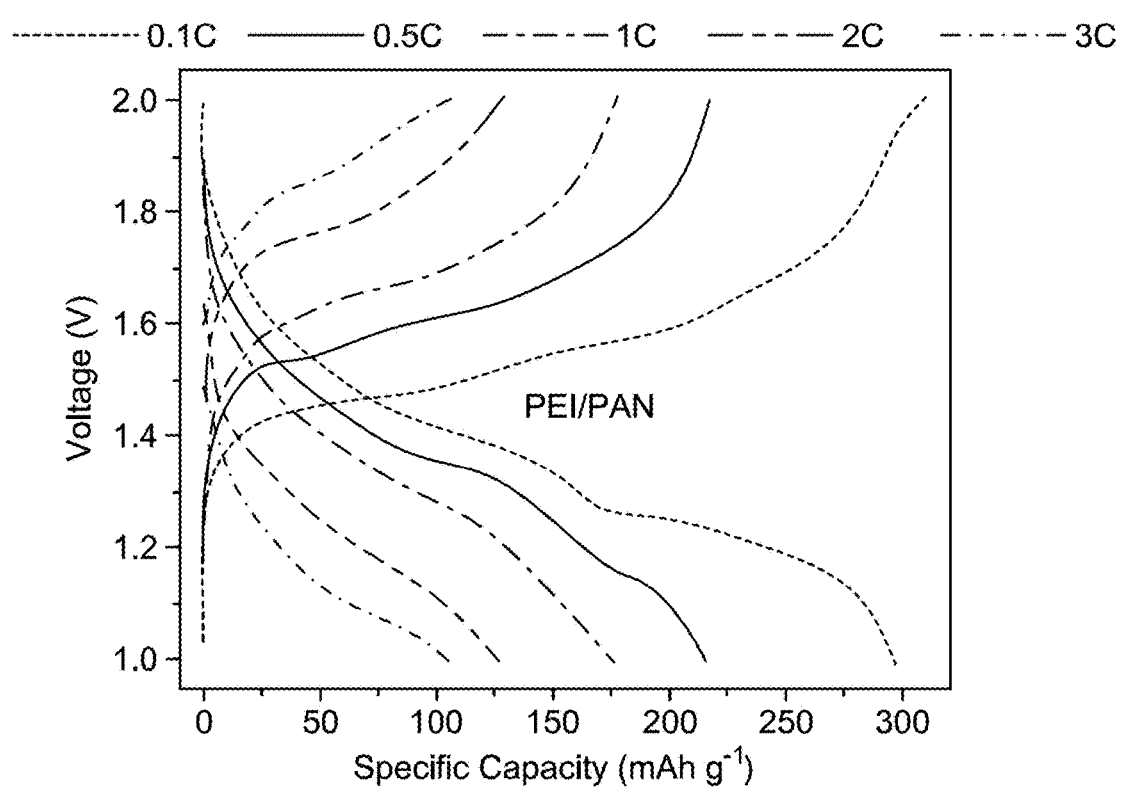
FIG. 11C is the charge/discharge patterns of the batteries assembled with Zn/PEI/PAN/MnO$_2$ membrane at various C-rate values from 0.1 to 3C, according to certain embodiments.
Figure 11D:
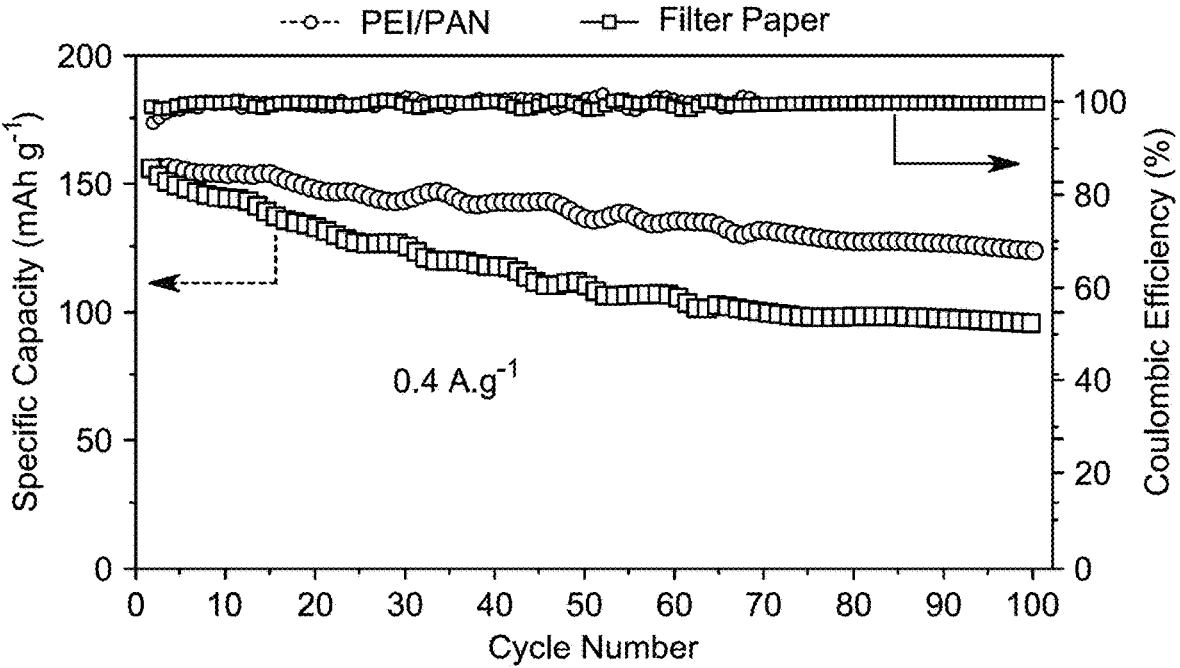
FIG. 11D is the stability of Zn/MnO$_2$ batteries for a period of 100 cycles of operation using a PEI/PAN membrane and a filter paper separator operating at 0.4 A g$^{-1}$, according to certain embodiments.
Figure 11E:
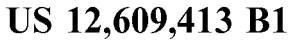
FIG. 11E is the charge/discharge patterns of the Zn/Filter Paper/MnO$_2$ at the 25th, 50th, 75th and 100th cycles for the AZIBs at 0.4 A g$^{-1}$, according to certain embodiments.
Figure 11E:
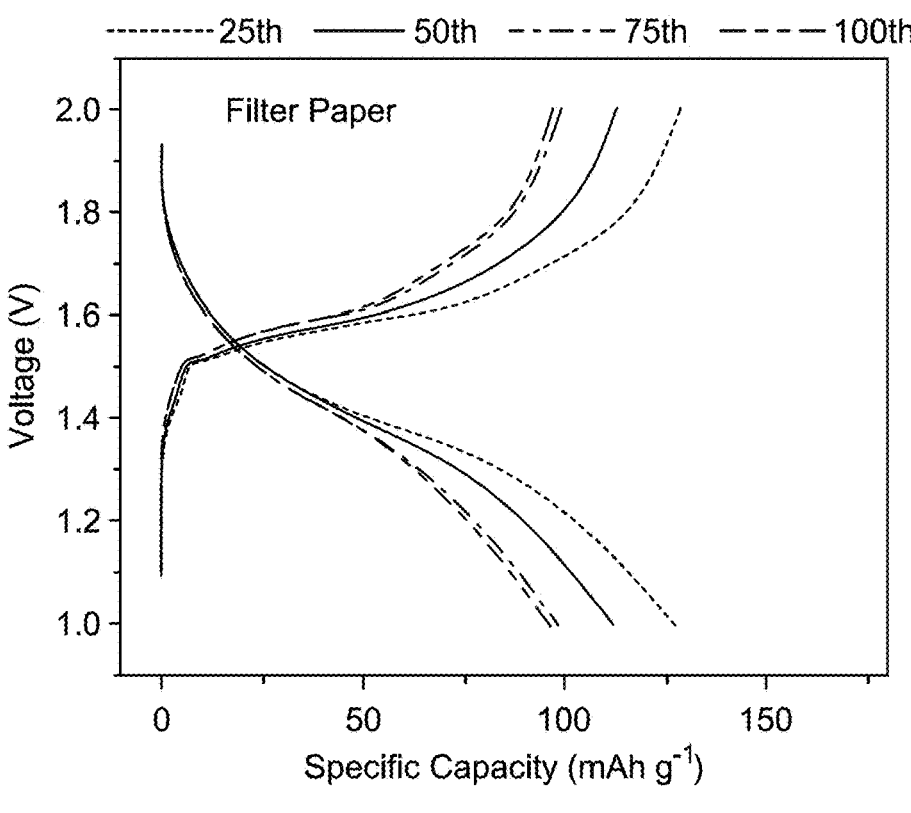
Figure 11F:
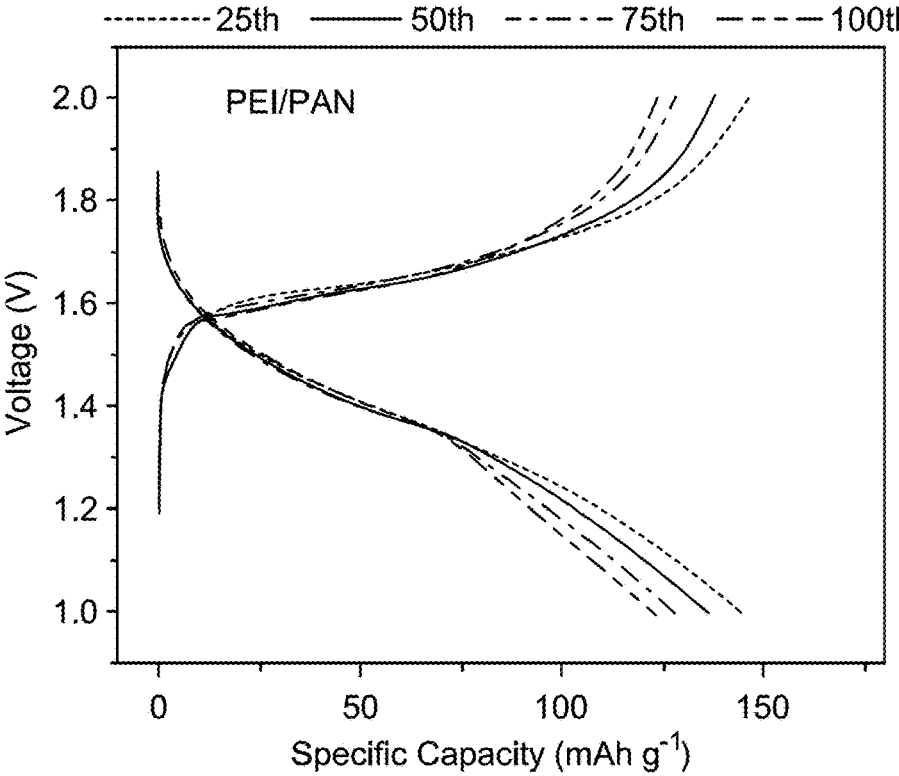
FIG. 11F is the charge/discharge patterns of the Zn/PEI/PAN/MnO$_2$ membrane at the 25th, 50th, 75th and 100th cycles for the AZIBs at 0.4 A g$^{-1}$, according to certain embodiments.
Figure 11G:
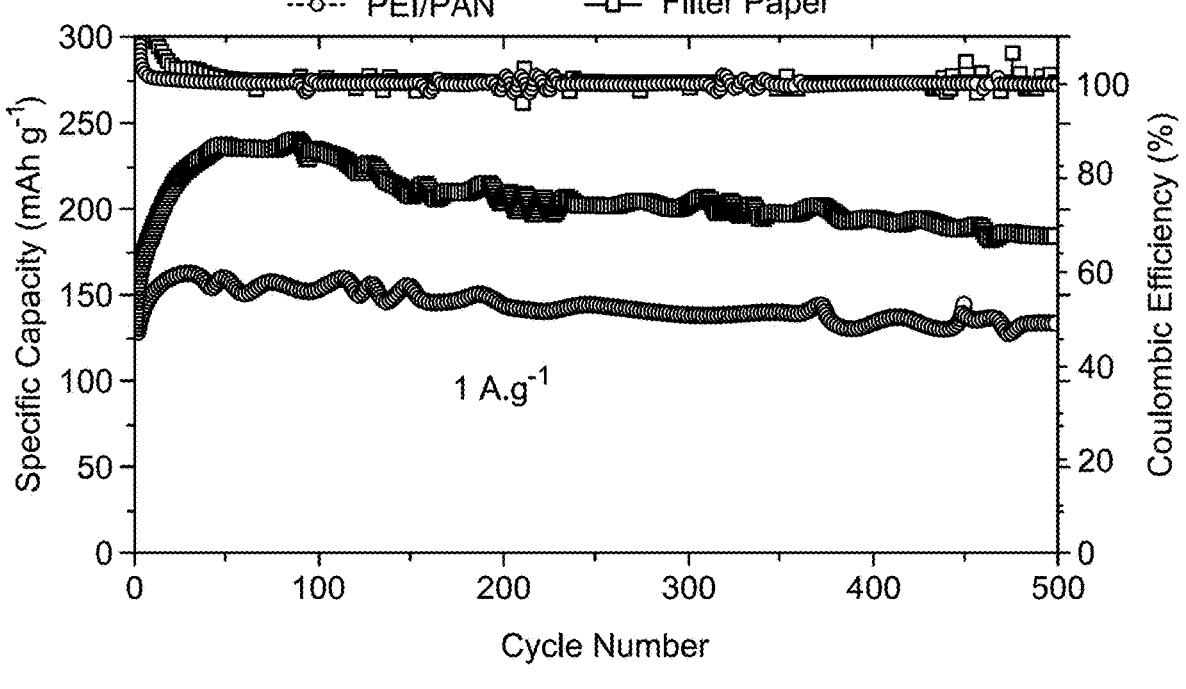
FIG. 11G is the cycling performance of the Zn/PEI/PAN/MnO$_2$ and the Zn/Filter Paper/MnO$_2$ coin cell for 500 cycles at a high current density of 1 A g$^{-1}$, according to certain embodiments.

In the next step, we evaluate the performance of the as-fabricated membrane as the cathode for AZIBs. FIG. 11A displays the rate performance of the Filter paper separator and PEI/PAN batteries. The filter paper battery's specific capacity (267 mAh $g^{-1}$) is less than that of the PEI/PAN, which yields 302 mAh $g^{-1}$ at 0.1 A $g^{-1}$ at the first cycle, in line with the CV results. Despite this, the PEI/PAN provides more capacity at each current density after the activation process in the first cycles compared to the other two systems. The charge/discharge behaviour of both samples is displayed in FIGS. 11B-C. The PEI/PAN system's specific capacity at 3C could extend to 105 mA h $g^{-1}$, superior to filter paper (89 mAh $g^{-1}$). At 0.4 A $g^{-1}$, the cycle stability of the Zn/$MnO_2$ batteries containing PEI/PAN membrane was evaluated (FIG. 11D). In contrast, it also displays the filter paper system. PEI/PAN has 154 mA h $g^{-1}$ initial specific capacity, somewhat less than filter paper's 156. On the other hand, the PEI/PAN system needs an activation procedure, and after a few cycles, the specific capacity rises to more than filter paper. This phenomenon may be explained by the opening of conducting channels through chemical coordination. There is still a high retention of 80% and a discharge/capacity of 123 mAh $g^{-1}$ after 100 cycles. As opposed to this, the filter paper method shows a high capacity fading rate, leading to a low capacity of 96 mAh $g^{-1}$, translating to a low retention of 61% after 100 cycles. Concurrently presented in FIGS. 11E-F are the charge/discharge curves that correspond to the 25th, 50th, 75th, and 100th cycles, respectively. The filter paper system exhibits a noticeable rise in voltage polarization. Still, the PEI/PAN system gradually experiences a decrease in voltage polarization due to the initial activation process and limited dendritic development. At a high current density of 1.0 A $g^{-1}$ in FIG. 11G, the PEI/PAN maintained a stable discharge capacity of 181 mA h $g^{-1}$ after 500 cycles. In sharp contrast, the Filter Paper exhibited a specific capacity of 132 mAh $g^{-1}$ after 500 cycles, respectively. These findings demonstrate the structural stability of the PEI/PAN membrane and its capacity to efficiently encourage zinc's uniform deposition while inhibiting its expansion throughout an extended cycle. The longevity of symmetric zinc cells aligns with this since the zinc anode undergoes identical stripping and plating procedures.

In this present disclosure, the PEI/PAN membrane has manufactured in comparison to several membranes that are now accessible for commercial use and have been reported in the past as shown in Table 2. Compared to commercial membranes and membranes that have been published in the past, our fabricated PEI/PAN membrane demonstrates superior capacity and a higher current density in AZIBs.

TABLE 2

Comparative analysis of the PEI/PAN membrane with a selection of membranes that are now available for commercial use and have been reported earlier.

| Membrane Type | Fabrication technique | Cathode/ Anode | Electrolyte | Capacity ($Ag^{-1}$) (mAh $g^{-1}$) | Ref. |
|---|---|---|---|---|---|
| Towel cotton | Commercial | Zn – $MnO_2$ | 2 · M · $ZnSO_4$ · + 0.2M$MnSO_4$ | 96.9 · (1A$g^{-1}$) | [1] |
| Cellulose-Persimmon carbon | Immersion | Zn – $V_2O_5$ | 2 · M · $ZnSO_4$ | 114.3 · (1A$g^{-1}$) | [2] |
| Cellulose‖ nanofibers | / | Zn – $V_2O_5$ | 2 · M · $ZnSO_4$ | 165 · (1A$g^{-1}$) | [3] |
| PAN | Electrospinning | Zn – $MnO_2$ | 2 · M · $ZnCl_2$ + 0.2M$MnSO_4$ | 140 · (1A$g^{-1}$) | [4] |
| Cellulose-nanofibers- + Graphene | Solution-casting | Zn – $V_2O_5$ Zn – $MnO_2$ | 2M – Zn ($CF_3SO_3$)$_2$ 2MZn$SO_4$ + 0.5M · Mn$SO_4$ | 75 · (1A$g^{-1}$) | [5] |
| Bipolar membranes | / | 3M Zn(OTf)$_2$ | Zn – $VO_2$/ rGO | 20 · (0.1A$g^{-1}$) | [6] |
| PEI/PAN | Electrospinning | Zn – $MnO_2$ | 2 · M · $ZnSO_4$ · + 0.2M$MnSO_4$ | 181 · (1A$g^{-1}$) | This work |

[1] Cao, P.; et al, *ACS Sustainable Chemistry & Engineering* 2022, 10 (26), 8350, incorporated herein by reference in its entirety.

[2] Guo, G.; et al, *Journal of Power Sources* 2023, 553, 232321, incorporated herein by reference in its entirety.

[3] Zhang, X.; et al., *Electrochimica Acta* 2022, 430, 141081, incorporated herein by reference in its entirety.

[4] Shao, Z.; et al., *ACS Applied Materials & Interfaces* 2021, 13 (29), 34349, incorporated herein by reference in its entirety.

[5] Cao, J.; et al., *Advanced Energy Materials* 2021, 11 (29), 2101299, incorporated herein by reference in its entirety.

[6] Dai, Y.; et al., *ACS Energy Letters* 2021, 6 (2), 684-686, incorporated herein by reference in its entirety.

In the present disclosure, the electrospinning method with entangled nanofibers to design and prepared a superior two-component nanofiber-based PAN-PEI composite membrane. The PEI/PAN membrane that was prepared demonstrated exceptional thermo-stability, a high porosity, good electrolyte wettability, and remarkable electrolyte absorption due to its consistent, twisted, and interconnected porous morphology. The resulting PAN-PEI membrane exhibits a high ionic conductivity of 5.3*$10^{-4}$ S $cm^{-1}$ at room temperature and decent thermal stability of 200° C. In the meantime, the PEI/PAN polymer chain effectively suppresses the growth and development of Zn dendrites by enabling homogenous Zn deposition that is entrenched inside the network and successfully generates an even and stable SEI film on the Zn metal electrode. Thus, at the high current density of 3 mA $cm^{-2}$ above a cycle period of 260 h, AZIBs with PEI/PAN membranes retain a low overpotential and exhibit excellent Zn stripping/plating performance. Furthermore, the $MnO_2$/Zn half cells showed an intriguing cycle and rate performances in contrast to commercial filter paper. Ultimately, the endearing qualities combined with an easy-to-implement and effective concept to create porous membranes with customizable morphology indicate bright futures for AZIBs.

Numerous modifications and variations of the present disclosure are possible in light of the above teachings. It is therefore to be understood that within the scope of the appended claims, the invention may be practiced otherwise than as specifically described herein.

The invention claimed is:

1. An aqueous zinc-ion battery cell, comprising:
   a membrane, an aqueous electrolyte solution, a zinc metal anode, and a cathode,
   wherein the membrane comprises electrospun polyethylenimine (PEI) and polyacrylonitrile (PAN) in the form of entangled nanofibers, wherein the membrane contains at least a portion of the aqueous electrolyte solution and separates the zinc metal anode and the cathode,
   wherein the cathode contains one or more selected from the group consisting of zinc and magnesium oxide.

2. The zinc ion battery of claim 1, having a capacity of 170-190 A $g^{-1}$.

3. The zinc ion battery of claim 1, having a discharge/capacity of 100-150 mAh $g^{-1}$ over 80-120 cycles.

4. The zinc ion battery of claim 1, the membrane having a thickness of 150-250 μm.

5. The zinc ion battery of claim 1, the membrane having a porosity of 70-95%.

6. The zinc ion battery of claim 1, the membrane having an ionic conductivity of 3-7×$10^{-4}$ S $cm^{-1}$.

7. The zinc ion battery of claim 1, the membrane having a bulk resistance of 1-3Ω.

8. The zinc ion battery of claim 1, the membrane having an electrolyte uptake of 600-1000%.

9. The zinc ion battery of claim 1, the membrane having less than 5% thermal shrinkage up to 200° C.

10. The zinc ion battery of claim 1, wherein the membrane is semicrystalline by XRD.

11. A method of making the membrane of claim 1, comprising:
   dissolving PEI in a first organic solvent at 60-100° C. to form a first solution;
   dissolving PAN in a second organic solvent at 10-40° C. to form a second solution;
   mixing the first solution and the second solution together to form a mixture;
   electrospinning the mixture to form nanofibers;
   drying the nanofibers to form the membrane.

12. The method of claim 11, wherein the first organic solvent is dimethylformamide.

13. The method of claim 11, wherein the second organic solvent is dimethylformamide.

14. The method of claim 11, wherein the mixture is electrospun at a flow rate of 40-80 mL h$^{-1}$.

15. The method of claim 11, wherein the mixture is electrospun at a voltage of 15-25 kV.

16. The method of claim 11, wherein the mixture is electrospun at a distance of 100-200 mm between the tip of a needle and a collection surface.

17. A method of making the cathode of claim 1, comprising:

combining a metal oxide, carbon black, polyvinylidene fluoride, N-methylpyrrolidone, and an agate mortar to form a mixture;

applying the mixture to a carbon cloth substrate and heating for 8-16 hours at a temperature of 60-100° C. to form the cathode.

18. The method of claim 17, wherein the metal oxide is manganese oxide.

* * * * *